(12) United States Patent
Landgård et al.

(10) Patent No.: US 12,071,769 B2
(45) Date of Patent: Aug. 27, 2024

(54) BUILDING PANELS COMPRISING A LOCKING DEVICE

(71) Applicant: Välinge Innovation AB, Viken (SE)

(72) Inventors: Caroline Landgård, Höganäs (SE); Marcus Ståhl, Höganäs (SE); Darko Pervan, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 17/588,698

(22) Filed: Jan. 31, 2022

(65) Prior Publication Data

US 2022/0243482 A1 Aug. 4, 2022

(30) Foreign Application Priority Data

Feb. 3, 2021 (SE) .................................. 2150123-4

(51) Int. Cl.
*E04F 15/02* (2006.01)
*B32B 3/06* (2006.01)
(Continued)

(52) U.S. Cl.
CPC .......... *E04F 15/02038* (2013.01); *B32B 3/06* (2013.01); *B32B 21/02* (2013.01);
(Continued)

(58) Field of Classification Search
CPC . E04F 15/02038; E04F 13/0894; E04F 15/04; E04F 2201/0115; E04F 2201/023;
(Continued)

(56) References Cited

U.S. PATENT DOCUMENTS 8,615,952 B2 * 12/2013 Engstrom ......... E04F 15/02038
52/489.2
8,621,814 B2 * 1/2014 Cappelle ........... E04F 15/02038
52/592.1
(Continued)

FOREIGN PATENT DOCUMENTS

DE 10 2007 063 837 B3 1/2020
EP 3 581 732 A1 12/2019
(Continued)

OTHER PUBLICATIONS

U.S. Appl. No. 17/337,699, Johan Svensson, filed Jun. 3, 2021.
(Continued)

*Primary Examiner* — Gisele D Ford
(74) *Attorney, Agent, or Firm* — Boone IP Law

(57) ABSTRACT

The disclosure relates to building panels, such as floor panels, including a locking device. The locking device includes a protrusion and a groove configured to cooperate for vertical locking of a first edge portion of a first building panel to an adjacent second edge portion of a second building panel. The locking device further includes a separate tongue arranged in an insertion groove and a recess configured to cooperate for horizontal locking of the first and the second edge portions. The first and second edge portions are configured to be assembled by a relative essentially horizontal displacement and/or by angling. The insertion groove is provided vertically below at least one horizontal plane extending along a vertical locking surface provided in a third edge portion of the first building panel.

17 Claims, 9 Drawing Sheets

(51) Int. Cl.
  *B32B 21/02*   (2006.01)
  *B32B 21/04*   (2006.01)
  *B32B 21/14*   (2006.01)
  *E04F 13/08*   (2006.01)
  *E04F 15/04*   (2006.01)

(52) U.S. Cl.
  CPC ............ *B32B 21/042* (2013.01); *B32B 21/14* (2013.01); *E04F 13/0894* (2013.01); *B32B 2419/04* (2013.01); *E04F 15/04* (2013.01); *E04F 2201/0115* (2013.01); *E04F 2201/023* (2013.01); *E04F 2201/043* (2013.01)

(58) Field of Classification Search
  CPC ...... E04F 2201/043; B32B 3/06; B32B 21/02; B32B 21/042; B32B 21/14; B32B 2419/04
  See application file for complete search history.

(56) References Cited

U.S. PATENT DOCUMENTS

| | | | |
|---|---|---|---|
| 8,887,468 | B2 | 11/2014 | Håkansson et al. |
| 9,206,611 | B2* | 12/2015 | Vermeulen ............... E04B 5/023 |
| 9,366,036 | B2* | 6/2016 | Pervan ....................... E04B 5/02 |
| 9,375,085 | B2 | 6/2016 | Derelöv |
| 9,518,394 | B2* | 12/2016 | Engström ................. E04F 15/04 |
| 9,538,842 | B2 | 1/2017 | Håkansson et al. |
| 9,655,442 | B2 | 5/2017 | Boo et al. |
| 9,714,672 | B2 | 7/2017 | Derelöv et al. |
| 9,723,923 | B2 | 8/2017 | Derelöv |
| 9,726,210 | B2 | 8/2017 | Derelöv et al. |
| 9,945,121 | B2 | 4/2018 | Derelöv |
| 10,034,541 | B2 | 7/2018 | Boo et al. |
| 10,100,531 | B2* | 10/2018 | Devos ....................... E04F 15/10 |
| 10,202,996 | B2 | 2/2019 | Håkansson et al. |
| 10,415,613 | B2 | 9/2019 | Boo |
| 10,448,739 | B2 | 10/2019 | Derelöv et al. |
| 10,451,097 | B2 | 10/2019 | Brännström et al. |
| 10,486,245 | B2 | 11/2019 | Fridlund |
| 10,506,875 | B2 | 12/2019 | Boo et al. |
| 10,544,818 | B2 | 1/2020 | Fridlund |
| 10,548,397 | B2 | 2/2020 | Derelöv et al. |
| 10,669,716 | B2 | 6/2020 | Derelöv |
| 10,670,064 | B2 | 6/2020 | Derelöv |
| 10,683,668 | B2* | 6/2020 | De Rick ................. E04F 15/107 |
| 10,724,564 | B2 | 7/2020 | Derelöv |
| 10,731,688 | B2 | 8/2020 | Brännström et al. |
| 10,736,416 | B2 | 8/2020 | Derelöv et al. |
| 10,830,266 | B2 | 11/2020 | Fridlund |
| 10,830,268 | B2 | 11/2020 | Boo |
| 10,871,179 | B2 | 12/2020 | Håkansson et al. |
| 10,876,562 | B2 | 12/2020 | Pervan |
| 10,876,563 | B2 | 12/2020 | Derelöv et al. |
| 10,968,936 | B2 | 4/2021 | Boo et al. |
| 11,076,691 | B2 | 8/2021 | Boo |
| 11,083,287 | B2 | 8/2021 | Boo et al. |
| 11,098,484 | B2 | 8/2021 | Derelöv |
| 11,137,007 | B2 | 10/2021 | Fridlund |
| 11,204,051 | B2 | 12/2021 | Brännström et al. |
| 11,246,415 | B2 | 2/2022 | Derelöv et al. |
| 11,272,783 | B2 | 3/2022 | Derelöv |
| 11,326,636 | B2 | 5/2022 | Pervan |
| 2006/0236642 | A1* | 10/2006 | Pervan ............... E04F 15/02005 52/578 |
| 2008/0110125 | A1* | 5/2008 | Pervan ..................... E04F 15/04 52/582.2 |
| 2008/0134613 | A1* | 6/2008 | Pervan ..................... E04B 5/00 52/582.2 |
| 2008/0134614 | A1* | 6/2008 | Pervan ..................... E04B 5/00 52/588.1 |
| 2009/0064624 | A1* | 3/2009 | Sokol ....................... E04F 15/02 52/591.5 |
| 2009/0100782 | A1* | 4/2009 | Groeke ................... E04F 15/02 52/309.3 |
| 2010/0043333 | A1* | 2/2010 | Hannig ................. F16B 5/0056 52/582.2 |
| 2012/0279161 | A1 | 11/2012 | Håkansson et al. |
| 2013/0014463 | A1* | 1/2013 | Pervan .................. E04F 15/107 52/582.2 |
| 2013/0042562 | A1* | 2/2013 | Pervan ................ E04F 13/0894 52/582.2 |
| 2015/0035422 | A1 | 2/2015 | Håkansson et al. |
| 2015/0078807 | A1 | 3/2015 | Brännström et al. |
| 2015/0078819 | A1 | 3/2015 | Derelöv et al. |
| 2015/0196118 | A1 | 7/2015 | Derelöv |
| 2015/0198191 | A1 | 7/2015 | Boo |
| 2015/0300029 | A1* | 10/2015 | Pervan .............. E04F 15/02038 52/582.2 |
| 2016/0007751 | A1 | 1/2016 | Derelöv |
| 2016/0174704 | A1 | 6/2016 | Boo et al. |
| 2016/0270531 | A1 | 9/2016 | Derelöv |
| 2017/0079433 | A1 | 3/2017 | Derelöv et al. |
| 2017/0089379 | A1 | 3/2017 | Pervan |
| 2017/0097033 | A1 | 4/2017 | Håkansson et al. |
| 2017/0159291 | A1 | 6/2017 | Derelöv |
| 2017/0208938 | A1 | 7/2017 | Derelöv et al. |
| 2017/0227031 | A1 | 8/2017 | Boo |
| 2017/0227032 | A1 | 8/2017 | Fridlund |
| 2017/0227035 | A1 | 8/2017 | Fridlund |
| 2017/0234346 | A1 | 8/2017 | Fridlund |
| 2017/0298973 | A1 | 10/2017 | Derelöv |
| 2017/0328072 | A1* | 11/2017 | Hannig ............. E04F 15/02038 |
| 2017/0360193 | A1 | 12/2017 | Boo et al. |
| 2018/0080488 | A1 | 3/2018 | Derelöv |
| 2018/0087552 | A1 | 3/2018 | Derelöv et al. |
| 2018/0112695 | A1 | 4/2018 | Boo et al. |
| 2018/0119717 | A1 | 5/2018 | Derelöv |
| 2018/0202160 | A1 | 7/2018 | Derelöv |
| 2018/0328396 | A1 | 11/2018 | Fransson et al. |
| 2019/0113061 | A1 | 4/2019 | Håkansson et al. |
| 2019/0166989 | A1 | 6/2019 | Boo et al. |
| 2019/0191870 | A1 | 6/2019 | Derelöv |
| 2019/0195256 | A1 | 6/2019 | Derelöv |
| 2019/0289999 | A1 | 9/2019 | Derelöv et al. |
| 2019/0320793 | A1 | 10/2019 | Boo |
| 2019/0323532 | A1 | 10/2019 | Boo |
| 2019/0323533 | A1 | 10/2019 | Boo |
| 2019/0323534 | A1 | 10/2019 | Derelöv |
| 2019/0323535 | A1 | 10/2019 | Derelöv |
| 2020/0003242 | A1 | 1/2020 | Brännström et al. |
| 2020/0055126 | A1 | 2/2020 | Fridlund |
| 2020/0069048 | A1 | 3/2020 | Derelöv et al. |
| 2020/0069049 | A1 | 3/2020 | Derelöv et al. |
| 2020/0102978 | A1 | 4/2020 | Fridlund |
| 2020/0121076 | A1 | 4/2020 | Derelöv et al. |
| 2020/0214447 | A1 | 7/2020 | Derelöv et al. |
| 2020/0300284 | A1 | 9/2020 | Pervan |
| 2020/0337455 | A1 | 10/2020 | Boo et al. |
| 2020/0340513 | A1 | 10/2020 | Derelöv |
| 2021/0001662 | A1* | 1/2021 | Miclo ....................... B27C 5/00 |
| 2021/0047838 | A1* | 2/2021 | Miclo ..................... B29C 66/43 |
| 2021/0079650 | A1 | 3/2021 | Derelöv |
| 2021/0148392 | A1 | 5/2021 | Brännström et al. |
| 2021/0180630 | A1 | 6/2021 | Bruno et al. |
| 2021/0190112 | A1 | 6/2021 | Derelöv |
| 2021/0207635 | A1 | 7/2021 | Håkansson et al. |
| 2021/0222716 | A1 | 7/2021 | Derelöv et al. |
| 2021/0254349 | A1 | 8/2021 | Schäfers et al. |
| 2021/0262507 | A1 | 8/2021 | Svensson et al. |
| 2021/0262508 | A1 | 8/2021 | Svensson et al. |
| 2021/0276108 | A1 | 9/2021 | Derelöv et al. |
| 2021/0285480 | A1 | 9/2021 | Derelöv et al. |
| 2021/0324634 | A1* | 10/2021 | Cappelle ................. E04F 15/102 |
| 2021/0381251 | A1 | 12/2021 | Svensson |
| 2022/0018373 | A1 | 1/2022 | Boo |

(56) References Cited

U.S. PATENT DOCUMENTS

2022/0049735 A1  2/2022  Meijer
2022/0186761 A1  6/2022  Derelöv et al.

FOREIGN PATENT DOCUMENTS

WO   WO 2006/104436 A1   10/2006
WO   WO 2008/004960 A2    1/2008
WO   WO 2015/171068 A1   11/2015
WO   WO 2016/180980 A1   11/2016

OTHER PUBLICATIONS

U.S. Appl. No. 17/717,359, Darko Pervan, filed Apr. 11, 2022.
Office Action and Search Report issued in SE Patent Application No. 2150123-4, Oct. 27, 2021, PRV Swedish Patent and Registration Office, 6 pages.
Pervan, Darko, U.S. Appl. No. 17/717,359 entitled "Mechanical Locking System for Building Panels," filed in the U.S. Patent and Trademark Office Apr. 11, 2022.
International Preliminary Report on Patentability received for PCT Patent Application No. PCT/SE2022/050103, mailed on Aug. 17, 2023, 7 pages.
International Search Report and Written Opinion received for PCT Patent Application No. PCT/SE2022/050103, mailed on Mar. 24, 2022, 12 pages.

* cited by examiner

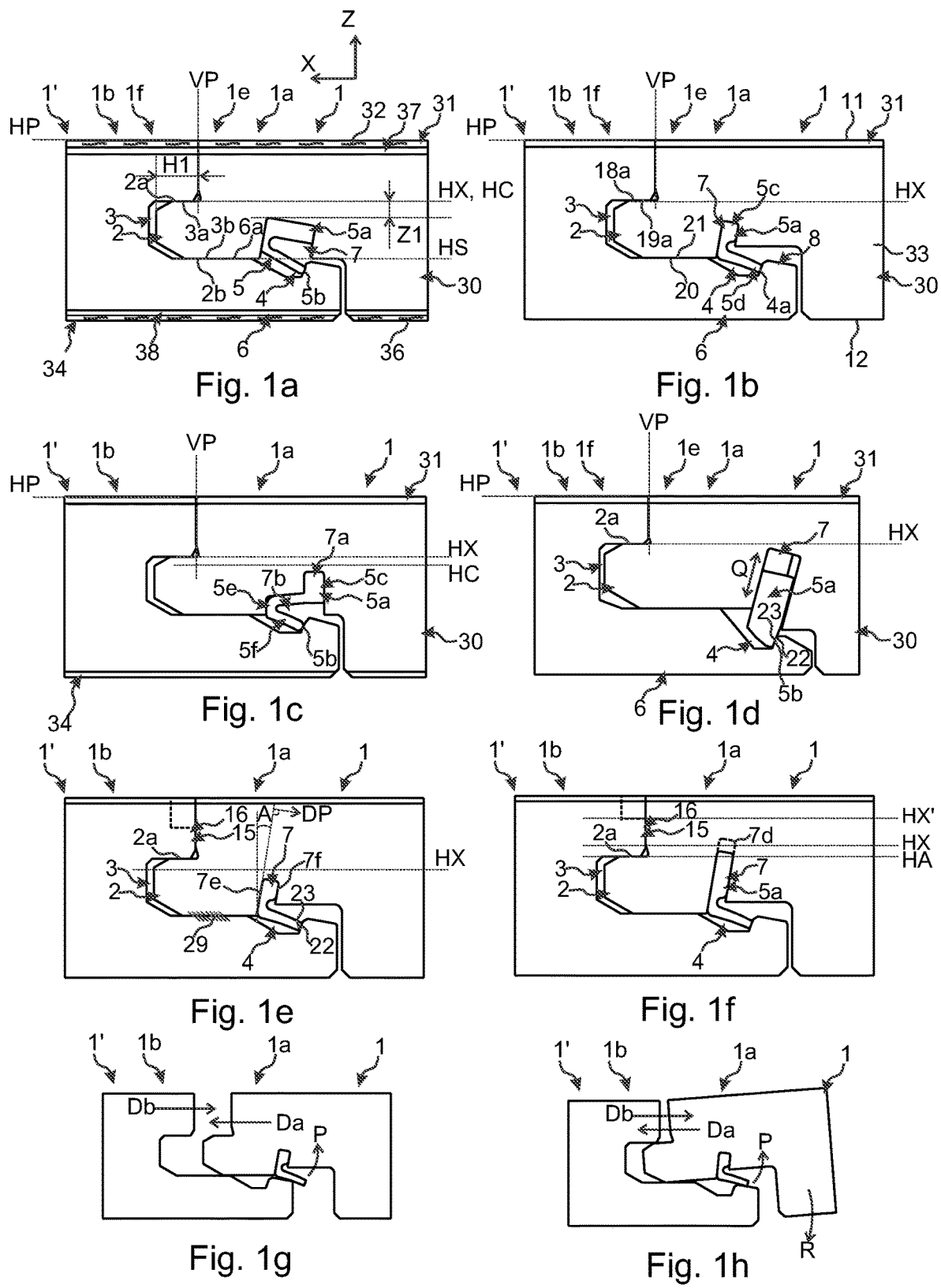

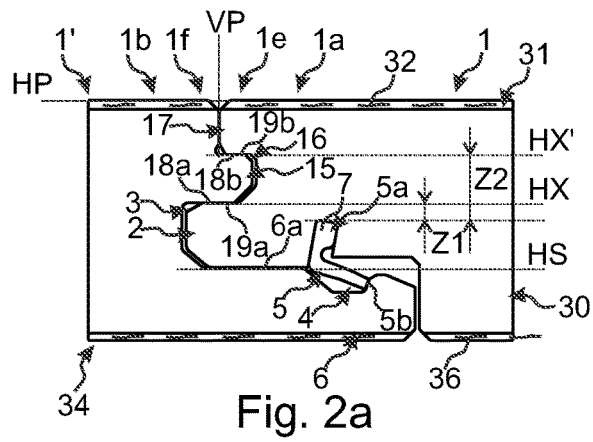
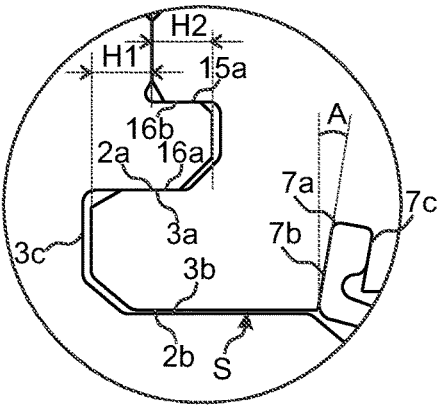
Fig. 2a
Fig. 2b
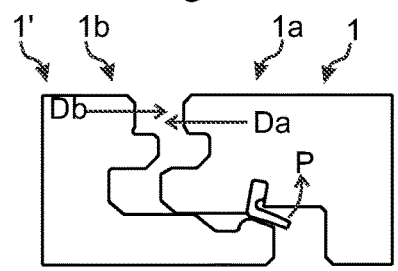
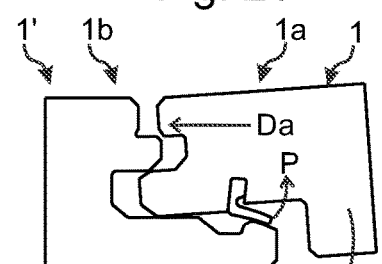
Fig. 2c
Fig. 2d
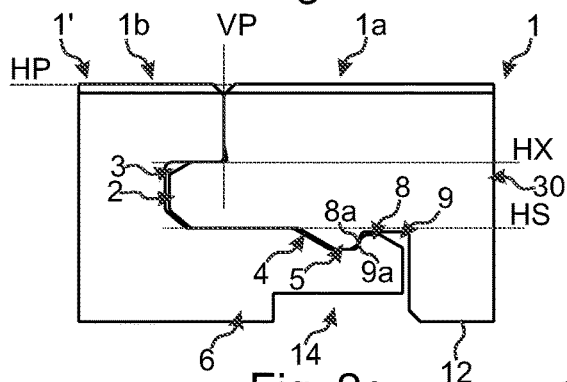
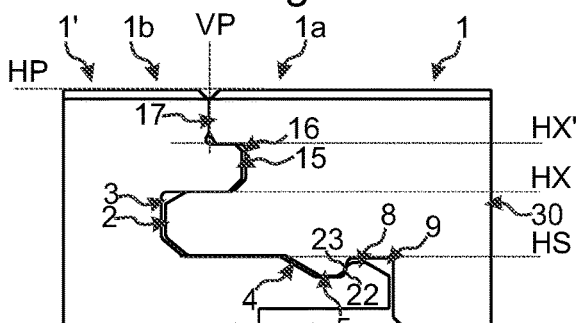
Fig. 2e
Fig. 2f
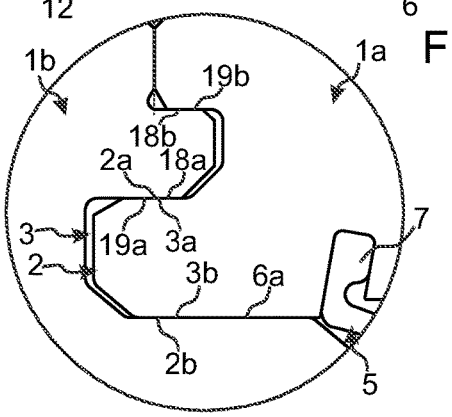
Fig. 2g

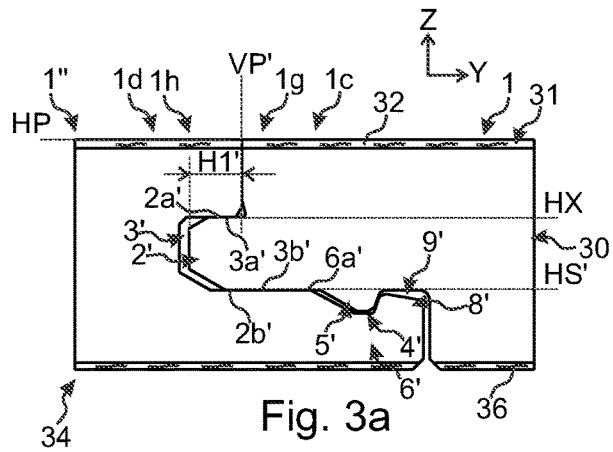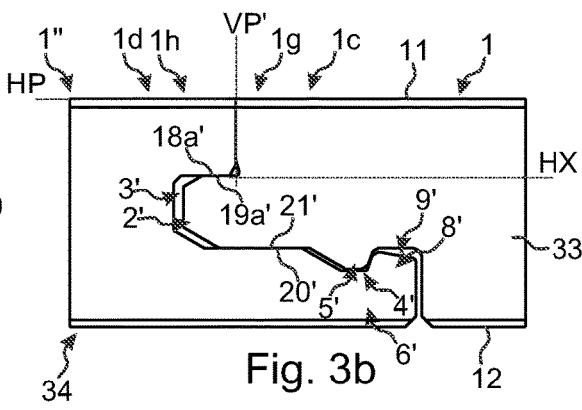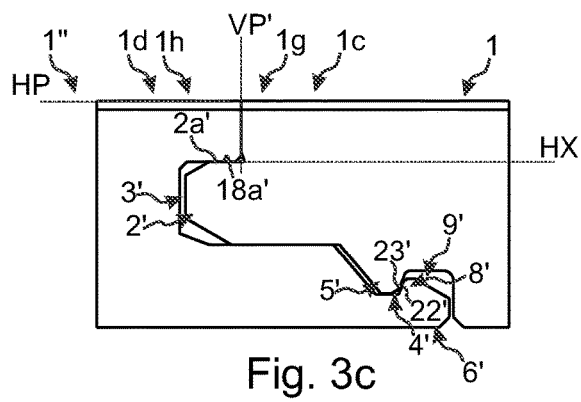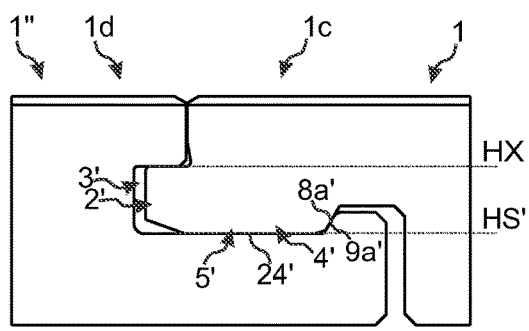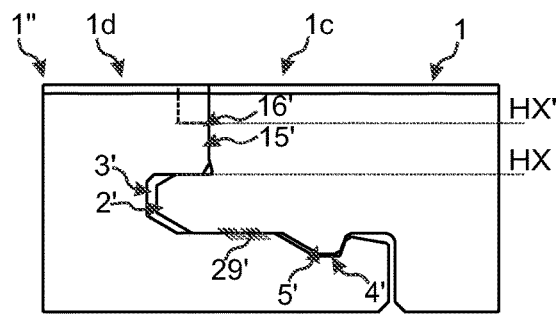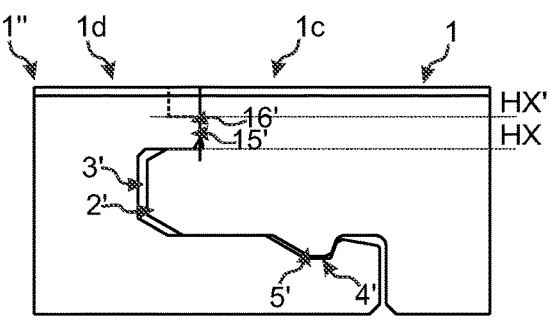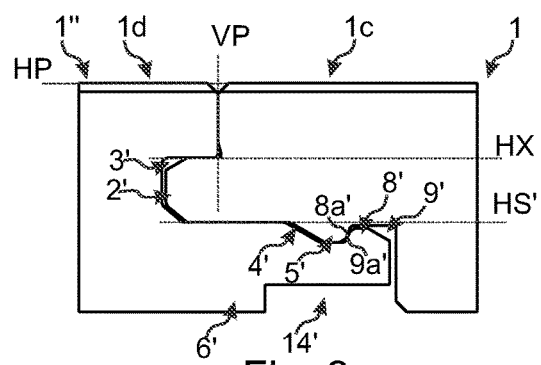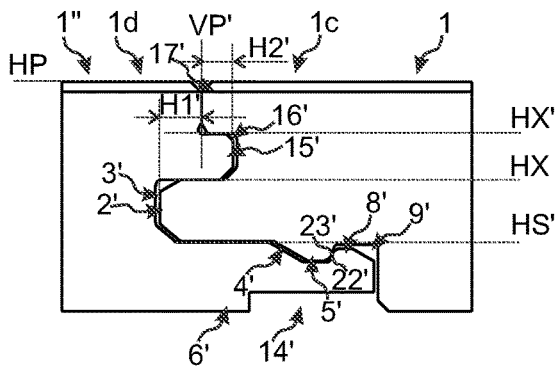

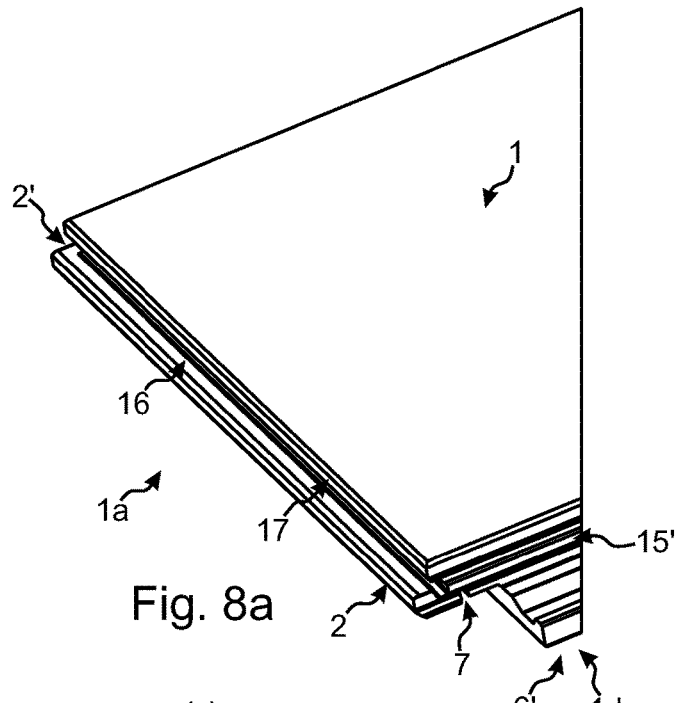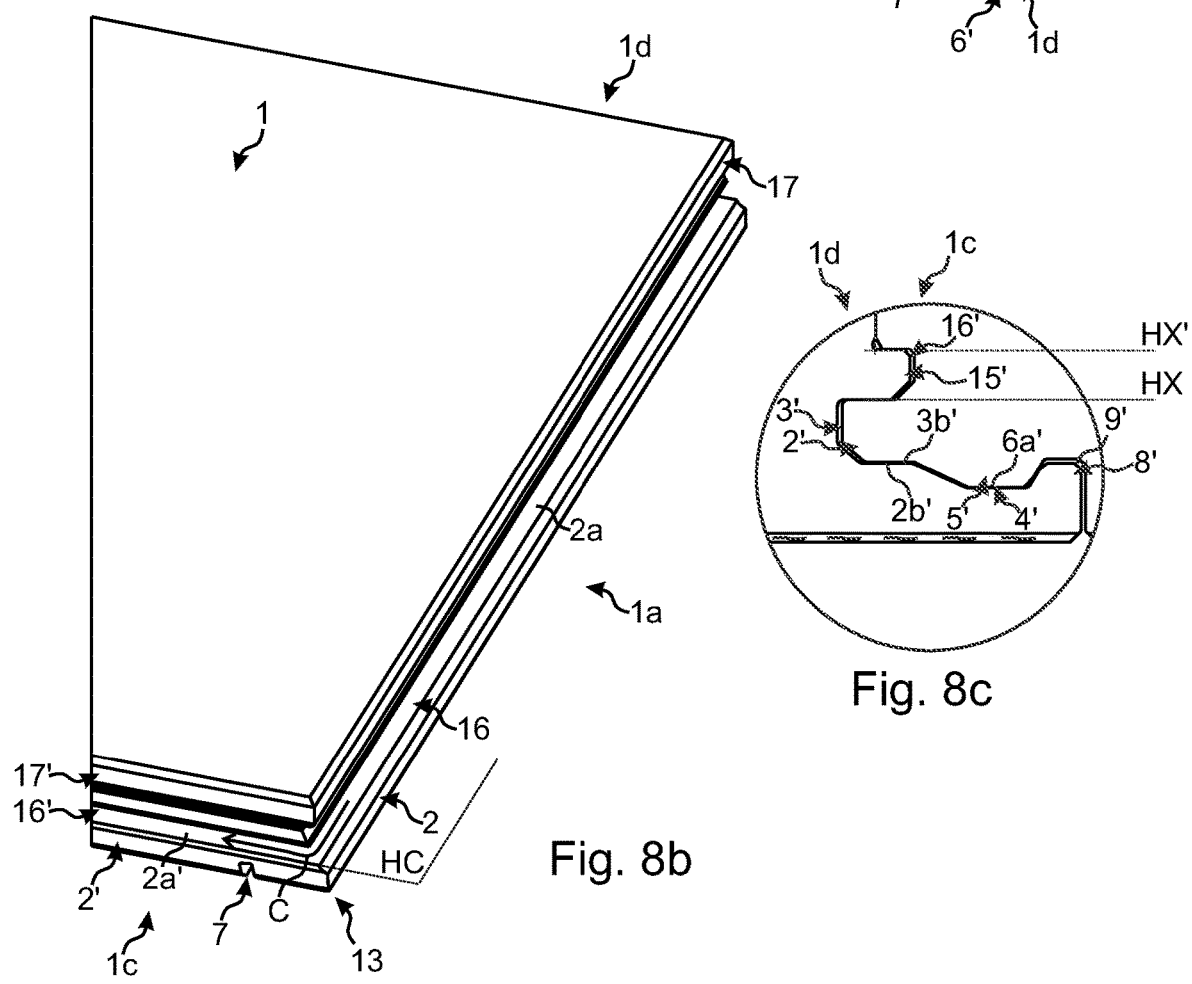

BUILDING PANELS COMPRISING A LOCKING DEVICE

CROSS REFERENCE TO RELATED APPLICATIONS

The present application claims the benefit of Swedish Application No. 21501234, filed on Feb. 3, 2021. The entire contents of Swedish Application No. 21501234 are hereby incorporated herein by reference in their entirety.

TECHNICAL FIELD

The disclosure generally relates to building panels comprising a locking device, preferably a mechanical locking device. More specifically, the disclosure relates to, preferably identical, building panels that may be assembled by a relative essentially horizontal displacement and/or by angling. Examples of building panels include floor panels, wall panels and furniture components.

BACKGROUND

WO 2006/104436 discloses a flooring system comprising a plurality of mechanically connectable floor panels. The panels are provided with a tongue and a groove as well as a flexible and resilient second locking element formed of a separate material and being connected to a locking groove. Two panels can be mechanically joined by a horizontal displacement towards each other, while at least a part of the second locking element is resiliently displaced vertically. The panel may be joined by angling or snapping.

WO 2015/171068 discloses a set of panels comprising a first and a second panel, which may be mechanically connected by an essentially linear relative displacement of the first and second panel when the first and second panel are arranged essentially in the same plane. A separate and flexible tongue arranged in an insertion groove is insertable into a tongue groove and a panel edge of the second panel is configured to cooperate with a core groove of the first panel for connecting the panels. A guiding protrusion of the tongue may be configured to guide a rod-shaped tool into the tongue groove when the rod-shaped tool is inserted into the insertion groove. Thereby, a simplified disassembly of the panels may be provided.

The known locking systems of the kind described above may provide a straightforward and simple joining of the panels by horizontal movements of panels arranged in parallel. Moreover, the construction of fail-safe locking systems having high locking strengths is conceivable, and, additionally, the design capabilities of joined panels are virtually unlimited. Despite these and many other benefits, however, there is still room for improvements, such as improvements of the sealing capabilities of the panels. Additionally, some of the technical superiorities of these locking systems, such as their strong vertical locking strengths, remain underutilized, especially in panel systems that are prone to deform under climate variations.

SUMMARY

It is therefore an object of at least embodiments of the present disclosure to provide a more water-resistant locking device in building panels configured to be assembled by a relative essentially horizontal displacement and/or by angling.

Another object of at least embodiments of the present disclosure is to provide building panels comprising such a locking device that possess more versatile assembling options.

Yet another object of at least embodiments of the present disclosure is to provide building panels comprising a locking device adapted to increase a lifetime of the building panels.

An additional object of at least embodiments of the present disclosure is to provide wood-based building panels comprising a locking device that is adapted to counteract deformations of the building panels, e.g., induced by humidity variations.

These and other objects and advantages that will be apparent from the description have been achieved by the various aspects, embodiments and examples described below.

In accordance with a first aspect of the disclosure, there is provided building panels, such as floor panels, comprising a locking device. The locking device comprises a protrusion and a groove configured to cooperate for vertical locking of a first edge portion of a first building panel to an adjacent second edge portion of a second building panel. The locking device further comprises an insertion groove provided in the first edge portion in which a separate tongue is arranged and a recess provided in a strip of the second edge portion extending horizontally beyond an upper portion of the second edge portion, wherein the recess and the separate tongue are configured to cooperate for horizontal locking of the first and the second edge portions. The first and second edge portions are configured to be assembled to each other by a relative essentially horizontal displacement of the first and second building panels against each other, preferably by snapping, and/or by angling of the first and second building panels relative to each other. The insertion groove is provided vertically below at least one horizontal plane extending along a vertical locking surface provided in a third edge portion of the first building panel. The third edge portion is configured to be assembled to an adjacent fourth edge portion of a third building panel by angling of the first and third building panels relative to each other and/or by a relative essentially horizontal displacement of the first and third building panels against each other, preferably by snapping.

In accordance with the first aspect, the protruding element may be continuously formed along the third edge portion, such as in a corner portion, of the first panel where at least one vertical locking surface may be provided. By being continuous, at least an upper portion of the protruding element may remain intact, e.g., not being fully penetrated by the insertion groove. Thereby, a seal of the locking device may be improved. In particular, a downwardly penetrating flow of a liquid substance, such as water, along the third edge portion, e.g., in the corner portion, may be counteracted or may even be entirely prevented. Thereby, a lifetime of the building panels may be increased, especially for panels installed in a wet or moist environment.

Nevertheless, if a liquid substance were to penetrate downwards, and the material of the panel(s) would deform, e.g., by swelling, the horizontal locking device in accordance with the first aspect may be adapted to compensate for horizontal disturbances or deformations of the material in an improved manner. For example, the horizontal locking device may be flexible and/or pretensioned.

The locking device may be a mechanical locking device.

A vertical (horizontal) locking surface of a panel disclosed herein may be a surface configured to vertically (horizontally) lock the panel, such as an edge portion thereof, to an adjacent panel, such as an adjacent edge portion thereof. The panels may be horizontally and vertically locked in an assembled state.

Generally herein, the wording "up, upper or upward", etc., may be a direction or position toward a front side of the panel and "down, lower or downward", etc., may be a direction or position toward a rear side.

The building panels, such as the locking device, may comprise a protruding element provided in the third edge portion for vertical locking of the third and fourth edge portions, wherein an upper side of the protruding element comprises the vertical locking surface. Thereby, the insertion groove may be provided vertically below the upper side, and at least an upper portion of the protruding element may remain intact, e.g., not being fully penetrated by the insertion groove. As a consequence, a locking device may be provided that may be sealed at least at the vertical locking surfaces of the protruding element and a cavity configured to cooperate with the protruding element.

The building panels, such as the locking device, may comprise a protruding element provided in the third edge portion for vertical locking of the third and fourth edge portions, wherein the protrusion and the protruding element extend continuously along a corner portion of the first building panel, such that the protrusion is gradually transformed into the protruding element along a horizontal continuous transition portion, such as a horizontal curve, disposed along the corner portion. Thereby, the protrusion and the protruding element may be jointly formed in a section of the corner portion and the seal of the locking device may be even further improved.

The building panels, such as the locking device, may comprise a female and a male connector provided in the third and fourth edge portions, respectively, for vertical locking of the third and fourth edge portions, wherein an upper wall of the female connector comprises the vertical locking surface. Thereby, the insertion groove may at least be provided vertically below the upper wall. As a consequence, a locking device may be provided that may be sealed at least at the, preferably upper, vertical locking surfaces of the female and male connectors. In some embodiments, however, the insertion groove may extend above the horizontal plane extending along the upper side of the protruding element, thereby providing a seal that may be acceptable for some applications. However, in embodiments where the insertion groove is further provided vertically below the horizontal plane extending along the upper side of the protruding element, as described above, a particularly tight twofold seal may be provided.

A top side of the protrusion and/or a top wall of a lip groove may be arranged between the protrusion and an upper shoulder portion may be provided along the at least one horizontal plane. Thereby, the top side may be provided at the same vertical level as the upper side of the protruding element and/or the top wall may be provided at the same vertical level as the upper wall of the female connector. This may be advantageous, or sometimes even necessary, when arranging the panels in a pattern, such as a herringbone pattern. For example, the first edge portion of panels in both of a first and a second set of different types of panels may be configured to be assembled to the second edge portion of panels in both of the first and second sets.

More generally, in some embodiments, at least a portion of, such as the entire, cross-sectional geometry of the locking device along the first and third edge portions and/or along the second and fourth edge portions, may be substantially identical, except possibly at corner portions of the panel. For example, at least one selected from the group of the strip, preferably comprising the recess or a depression, the protrusion, the groove, the protruding element, the cavity, the insertion groove, an insertion member, the lip, the lip groove, the male connector, the female connector (some of these elements are defined below) may be substantially identical.

It is noted, however, that in some embodiments, at least a portion of the cross-sectional geometry of the locking device along the first and third edge portions and/or along the second and fourth edge portions, may differ. This may be conceivable, e.g., when, say, long edge portions of the panels are configured to be provided in parallel in their assembled state. For example, the protrusion, such as the top side, may be provided above or below the protruding element, such as the upper side.

A vertically innermost portion of the insertion groove may be spaced from the at least one horizontal plane, such as by a distance which may be larger than zero.

In non-limiting examples, a depth of the insertion groove may be between 20% and 95%, such as 30% and 90%, of a thickness of the protrusion.

The insertion groove may be provided horizontally inside of, that is towards an interior of a panel, a vertical plane defined in an assembled state of the building panels by upper portions of the first and second edge portions, wherein the vertical plane is perpendicular to a horizontal plane, which is parallel to a front side and/or a rear side of the building panels, preferably in an assembled state of the building panels.

The insertion groove may be inclined, preferably inwards, such as in a direction and/or position towards a centre of the, preferably first, building panel.

The recess may be provided horizontally outside of, that is towards an exterior edge of a panel, the vertical plane in the assembled state.

The protrusion and the groove may be provided in the first edge portion and the second edge portion, respectively.

The first and second edge portions may comprise a lip groove and a lip, respectively, wherein the lip is configured to cooperate with the lip groove in an assembled state of the building panels. Vertical locking surfaces of the lip groove and a lip may provide a seal of the locking device.

The panels may be rectangular. The first and second edge portions may be short edge portions and the third and fourth edge portions may be long edge portions. Alternatively, the first and second edge portions may be long edge portions and the third and fourth edge portions may be short edge portions. For example, the, say, first edge portions of the panels may be provided in parallel in their assembled state.

In some embodiments, the panels may comprise a first and a second set of panels. The first and second edge portions of the first (second) set may be short (or long) edge portions and the third and fourth edge portions may be long (or short) edge portions. For example, the, say, first edge portions of all of the panels of both sets may be provided in parallel in their assembled state. Thereby, a pattern, such as a herringbone pattern may be provided.

It is clear that the examples above are only exemplary and that other combinations of short and long edge portions are equally conceivable. In addition, in some embodiments, the panels may be square such that all edge portions have the same longitudinal lengths.

The building panels, such as the locking device, may further comprise a locking groove provided in the third edge portion configured to cooperate with a locking element for horizontal locking of the third and fourth edge portions, wherein the locking element is provided on a strip extending beyond an upper portion of the fourth edge portion.

In some embodiments, the locking device may further comprise an insertion member provided in the third edge portion in which a, preferably separately formed, locking member is arranged and a depression provided in a strip of the fourth edge portion extending horizontally beyond an upper portion of the fourth edge portion, wherein the depression and the locking member are configured to cooperate for horizontal locking of the third and the fourth edge portions. Embodiments of the insertion member, the locking member and the strip comprising the depression may be the same as the embodiments of the insertion groove, the separate tongue and the strip comprising the recess described herein, whereby reference is made thereto for details.

Preferably, the separate tongue is flexible.

The separate tongue may comprise a locking portion configured to provide the horizontal locking, and preferably being pivotable and/or displaceable in a vertical direction, and optionally in a horizontal direction.

An inner portion of the separate tongue may be fixedly arranged in the insertion groove and an outer portion of the separate tongue may comprise the locking portion. An advantage of this embodiment is that the protruding element may be made thinner.

Indeed, the inner portion may not require a particularly deep insertion groove in order for it to be fixedly arranged.

At least a portion of the separate tongue may be displaceably arranged in the insertion groove. Preferably, the displacement is linear.

The separate tongue may be extruded. For example, it may be configured to be provided on a roll and may be cut into an appropriate length before arranging it in the insertion groove.

In any embodiment herein, the separate tongue (or locking member) may comprise a polymer-based material, such as thermoplastic material, e.g., polypropylene (PP), and optionally a reinforcing element, such as glass fibres.

Generally herein, the building panels may be floor panels, wall panels or furniture components. Preferably, the floor panels are adapted to provide a floating floor arrangement configured to be arranged on a subfloor.

In accordance with a second aspect of the disclosure, there is provided building panels, such as floor panels, comprising a locking device. The locking device comprises a protrusion and a groove and/or a lip groove and a lip configured to cooperate for vertical locking of a first edge portion of a first building panel to an adjacent second edge portion of a second building panel, wherein the protrusion and/or the lip groove and the groove and/or the lip are provided in the first and the second edge portion, respectively. The locking device further comprises a tongue provided in the first edge portion and a recess provided in a strip of the second edge portion extending horizontally beyond an upper portion of the second edge portion, wherein the recess and the tongue are configured to cooperate for horizontal locking of the first and the second edge portions. The first and second edge portions are configured to be assembled to each other by a relative essentially horizontal displacement of the first and second building panels against each other, preferably by snapping, and/or by angling of the first and second building panels relative to each other. The locking device further comprises a protruding element provided in a third edge portion of the first building panel for vertical locking of the third edge portion to an adjacent fourth edge portion of a third building panel, such as by angling of the first and third building panels relative to each other and/or by a relative essentially horizontal displacement of the first and third building panels against each other, preferably by snapping, and/or a male connector provided in a fourth edge portion of the second building panel for vertical locking of the fourth edge portion to an adjacent third edge portion of a fourth building panel, such as by angling of the second and fourth building panels relative to each other and/or by a relative essentially horizontal displacement of the second and fourth building panels against each other, preferably by snapping. The protrusion and the protruding element extend continuously along a corner portion of the first building panel, such that the protrusion is gradually transformed into the protruding element along a horizontal continuous transition portion, such as a horizontal curve, disposed along the corner portion and/or the male connector and the lip extend continuously along a corner section of the second building panel, such that the male connector is gradually transformed into the lip along a horizontal continuous transition portion, such as a horizontal curve, disposed along the corner section.

In accordance with the second aspect, at least upper portion(s) of the protrusion and/or the protruding element, and additionally or alternatively, the lip and/or the male connector, may remain intact in the corner portion and/or the corner section. As a consequence, an improved seal of the locking device may be provided.

Embodiments and examples of the second aspect may be largely analogous to the embodiments and examples of the first aspect, whereby reference is made thereto. In addition, the following embodiments and examples may be contemplated.

The corner portion may be provided horizontally outside of the tongue and, in a perpendicular direction, horizontally outside of a locking groove provided in the third edge portion.

The protrusion may extend along a major portion, preferably essentially an entirety, of the first edge portion. Alternatively, or additionally, the protruding element may extend along a major portion, preferably essentially an entirety, of the third edge portion. The major portion may include at least 50% of a longitudinal length of the respective edge portion.

The protrusion, such as a top and/or lower side thereof, and the protruding element, such as an upper and/or lower side thereof, may be provided at the same vertical level.

The third edge portion may further comprise a female connector configured to cooperate with a male connector in the fourth edge portion, wherein the male connector preferably extends along a major portion, optionally essentially an entirety, of the fourth edge portion.

A horizontal extension of the protrusion and/or the protruding element may be essentially constant along the first and/or third edge portion(s) in the corner portion.

The lip, such as an upper section thereof, and the male connector, such as an upper portion thereof, may be provided at the same vertical level and/or the lip groove, such as a lower section thereof, and the female connector, such as a lower portion thereof, may be provided at the same vertical level.

The tongue may be a separate tongue and the first edge portion may comprise an insertion groove in which the separate tongue is arranged.

The tongue may be integrally formed with the first building panel. In other words, the tongue may be formed in one-piece with the first building panel, such as in a core thereof.

The strip may comprise an undercut portion configured to accommodate a portion of the strip during a downward bending of the strip. This allows for an assembly of the first and second edge portions by the relative essentially horizontal displacement when the tongue is integrally formed. Preferably, the strip is flexible such that it may be bent into the undercut portion.

The locking device may further comprise a locking groove provided in the third edge portion configured to cooperate with a locking element for horizontal locking of the third and fourth edge portions, wherein the locking element is provided on a strip extending beyond an upper portion of the fourth edge portion.

The locking device may comprise an insertion member provided in the third edge portion in which a, preferably separately formed, locking member is arranged and a depression provided in the strip of the fourth edge portion, wherein the depression and the locking member are configured to cooperate for horizontal locking of the third and the fourth edge portions.

It is implicitly clear to a skilled person in the art that embodiments of the first, second, third and fourth panels, such as their edge portions, corner portions and corner sections, may be essentially identical or corresponding (e.g., mirror versions), and that all combinations therefore do not have to be explicitly outlined.

It is emphasized that embodiments and examples of the second aspect are equally conceivable as embodiments and examples of the first aspect, since they are clearly compatible when the tongue in accordance with the second aspect is a separate tongue.

In accordance with a third aspect of the disclosure, there is provided building panels, such as floor panels, comprising a locking device. The locking device comprises a protrusion and a groove configured to cooperate for vertical locking of a first edge portion of a first building panel to an adjacent second edge portion of a second building panel. The locking device further comprises an insertion groove provided in the first edge portion in which a separate tongue is arranged and a recess provided in a strip of the second edge portion extending horizontally beyond an upper portion of the second edge portion, wherein the recess and the separate tongue are configured to cooperate for horizontal locking of the first and the second edge portions. The first and second edge portions are configured to be assembled to each other by a relative essentially horizontal displacement of the first and second building panels against each other, preferably by snapping, and/or by angling of the first and second building panels relative to each other. The building panels comprises short and long edge portions and are configured to be arranged in a non-parallel pattern, such as a herringbone pattern. Moreover, the building panels comprise a core and a top layer comprising wood fibres, wherein, preferably in an assembled state of the building panels, a fibre orientation of at least a portion of the wood fibres of the top layer of the first building panel is provided mainly perpendicularly to a fibre orientation of at least a portion of the wood fibres of the top layer of the second building panel.

Alternatively, or additionally, the locking device in accordance with the third aspect may comprise a protruding element and a cavity configured to cooperate for vertical locking of a third edge portion of the first building panel to an adjacent fourth edge portion of a third building panel. The locking device may further comprise an insertion member provided in the third edge portion in which a separately formed locking member is arranged and a depression provided in a strip of the fourth edge portion extending horizontally beyond an upper portion of the fourth edge portion, wherein the depression and the separate locking member are configured to cooperate for horizontal locking of the third and the fourth edge portions. The third and fourth edge portions may be configured to be assembled to each other by a relative essentially horizontal displacement of the first and third building panels against each other, preferably by snapping, and/or by angling of the first and third building panels relative to each other.

Generally, a deformation of a panel with a wood-based top layer may be induced by an increased or decreased humidity level of the panel, which may cause a convex or a concave crowning or cupping of the panel, respectively, especially perpendicularly to the fibre orientation, such as in a corner portion or in a centre portion of a short edge portion. Panels assembled in parallel rows may be less sensitive to undesired crowning and cupping since both adjacent edge portions deform rather similarly.

Since the fibre orientations of adjacent panels arranged in the herringbone pattern or similar non-parallel patterns are mainly disposed perpendicularly to each other, the deformation effects under humidity variations are typically very different along their short and long edge portions and this may cause height differences between the panels, generally referred to as "overwood", which may not be acceptable from an industry standard point of view. Due to the protrusion and groove configuration and/or the protruding element and cavity configuration in accordance with the third aspect, a strong locking device may be provided and a deformation of at least one of the edge portions may thereby be counteracted.

This is to be contrasted with wood-based planks in known herringbone systems comprising a flexible horizontally protruding tongue whose widths typically need to be restricted due to their strong proneness to deform under humidity variations. The fibre orientation of the known planks is typically arranged in parallel with their long edges and, due to the relatively low vertical locking strength in such locking systems used in the known herringbone systems, a size exceeding 7 cm on the short sides of the planks is therefore, for all practical purposes, not feasible.

Wood shrinks and swells differently along and across the wood fibres that extend in the length direction of a log and that such a difference may in some instances be substantial. Wood lamella layers, e.g., with thickness of 2-4 mm, may be sawn along the log and wood veneer layers, e.g., with a thickness of about 0.6 mm, may be sliced across the log. Both such surface materials, that after drying may be used in top layers in building panels, such as floor panels, have a distinctive fibre orientation in a length direction of the surface material. The wood fibres of the top layer of each building panel may therefore be provided mainly along a, preferably longitudinal, length of the building panel. The fibre orientation may be provided along a horizontal plane, which is parallel to a front side and/or a rear side of the building panel.

By being provided mainly perpendicularly to each other, a major portion of wood fibres in the first edge portion, preferably in the entire top layer of first building panel, may be provided mainly perpendicularly to a major portion of the wood fibres in the second edge portion, preferably in the entire top layer of the second building panel (and similarly on the third and fourth edge portions).

The first and second edge portions may be short and long edge portions, respectively, or long and short edge portions, respectively.

The fibre orientation of the wood fibres of each of the first and second building panels may be essentially parallel with their respective long edge portions. Thereby, a deformation of the short edge portion(s) may be counteracted by means of the locking device. It is emphasized that, due to the strong vertical locking device in accordance with the third aspect, the short edge portions of the panels may be allowed to be relatively large, cf. the embodiments below. Incidentally, the deformation of the long edge portions may be much smaller and may typically be within the industry standard.

A longitudinal extension of the short edge portions may be larger than 7 cm, preferably larger than 8 cm, more preferably larger than 10 cm.

A longitudinal extension of the long edge portions may be smaller than 1.5 m, preferably smaller than 1.0 m. Thereby, the panels may be easier to handle during their assembly, e.g., due to low friction forces during a horizontal displacement along a direction parallel to the long edge portions.

The core and, preferably, the protrusion and/or protruding element, may comprise wood fibres. Preferably, the core comprises or is an HDF board or an MDF board.

A thickness of the top layer may be less than 3 mm, such as less than 1 mm. Indeed, too thick wood top layers may cause high swelling and shrinking forces.

The top layer may comprise, or may be, a wood lamella layer or a veneer layer.

The building panels may further comprise a, preferably wood based, balancing layer, preferably having a fibre orientation and/or thickness similar to the top layer.

The building panels may comprise a locking device in accordance with any of the embodiments and examples described in relation to the first and the second aspects, whereby reference is made thereto. In fact, the third aspect also includes embodiments in which the tongue and/or the prominence are/is integrally formed (see below).

Generically herein, by means of the relative horizontal locking on either pair or both pairs of edge portions, the panels in accordance with any of the first, second and third aspects may be arranged in a large number of patterns in a simple manner. This may be particularly advantageous for smaller panels, which may be easier to handle, e.g., due to low friction forces during the horizontal displacement along, say, the long edge portions. In non-limiting examples, a direction of the relative essentially horizontal, preferably linear, displacement(s) of the first and/or second panels against each other, may form an angle of less than 10°, preferably less than 5°, against the horizontal plane, which is parallel to the front and/or rear side(s) in the assembled state. At an end of the assembly, when the panels are nearly assembled, e.g., when the protrusion has entered the groove, the angle may be less than 2° or even 1°. Preferably, the panels are essentially parallel to each other during the relative essentially horizontal displacement, e.g., such that an angle between front sides of the panels along a displacement direction is less than 10°, preferably less than 5°. At the end of the assembly, the angle may be less than 2° or even 1°.

The vertical and/or horizontal locking surfaces described herein for the first, second and third aspects may cooperate by direct engagement or indirectly. For example, there may be a sealing agent, such as a wax or an adhesive, provided between the locking surfaces, thereby providing examples of an indirect engagement.

In any of the first, second and third aspects, the panels may comprise the first and second panels and, optionally, the third and/or the fourth panel.

Aspects of the disclosure herein has mainly been described above with reference to a few embodiments. However, as is readily appreciated by a person skilled in the art, other embodiments than the ones disclosed above are equally possible within the scope of aspects of the disclosure.

Generally, all terms used in the claims and in the items in the embodiment section below are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. Reference to one, two or a plurality of "at least one element", etc., may shortly be referred to as "the element(s)".

BRIEF DESCRIPTION OF THE DRAWINGS

The disclosure will in the following be described in connection to exemplary embodiments and in greater detail with reference to the appended exemplary drawings, wherein:

FIGS. 1a-1h illustrate in cross-sectional side views embodiments of assembled (FIGS. 1a-1f) first and second edge portions of a first and a second building panel as well as embodiments of their assembly (FIGS. 1g-1h).

FIGS. 2a-2g illustrate embodiments of assembled first and second edge portions in cross-sectional side views (FIGS. 2a and 2e-2f) and zoomed-in cross-sectional side views (FIGS. 2b and 2g) as well as embodiments of their assembly (FIGS. 2c-2d).

FIGS. 3a-3h illustrate in cross-sectional side views embodiments of assembled third and fourth edge portions of the first and a third building panel.

FIGS. 8a-8c illustrate embodiments of a building panel in perspective views (FIGS. 8a-8b) and an embodiment of assembled third and fourth edge portions in a zoomed-in cross-sectional side view (FIG. 8c).

DETAILED DESCRIPTION

Figure 4A:
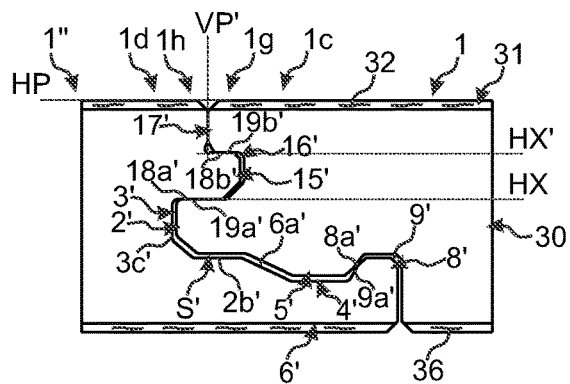
FIGS. 4a-4h illustrate embodiments of assembled third and fourth edge portions (FIGS. 4a-4d) in cross-sectional side views as well as embodiments of a separate tongue or a locking member in perspective views (FIGS. 4e-4f), a side view (FIG. 4g) and a top view (FIG. 4h).

Next, various embodiments of building panels comprising a locking device 10 in accordance with any of the first, second and third aspects will be described with reference to the embodiments in FIGS. 1a-1h, 2a-2g, 3a-3h, 4a-4h, 5a-5e, 6a-6d, 7a-7d, 8a-8c and 9a-9i. Preferably, the building panels, often abbreviated as panels herein, are floor panels, but other building panels are equally conceivable, such as wall panels or furniture components. In preferred embodiments, the panels are essentially identical to each other or essentially identical mirror versions of each other. The panels will typically be described below as being rectangular, but other panel shapes, such as square panels, are equally viable.

Each panel 1, 1', 1", etc. comprises a first edge portion 1a and an opposing second edge portion 1b as well as a third edge portion 1c and an opposing fourth edge portion 1d. The first 1a and second 1b edge portions may be short (or long) edge portions and the third 1c and fourth 1d edge portions may be long (or short) edge portions, preferably with the first edge portions 1a of the assembled panels being arranged in parallel. For example, a thickness of the panels may be 4-20 mm.

The panels may comprise a core 30 and, optionally, a, preferably visibly arranged, top layer 31 and/or a balancing layer 34. For example, the top layer 31 may comprise a decorative layer and/or a protective layer, such as a wear layer, lacquer or wax. In some embodiments, the top layer 31 may comprise a wood lamella layer or a veneer layer. In a first example, the core 30 may be a wood-based core comprising wood fibres 33, such as comprising or being an HDF board, an MDF board, a particle board or a plywood-based board. In a second example, the core 30 may be a polymer-based core, such as comprising a thermoplastic material or a thermosetting material, and preferably a filler. For example, the thermoplastic material may comprise PVC and, preferably a mineral-based filler, and the thermosetting material may comprise a melamine formaldehyde resin and, preferably, wood fibres. In a third example, the core 30 may be a mineral-based core, such as comprising magnesium oxide and, optionally, magnesium chloride (e.g. $MgCl_2$) and/or magnesium sulphate (e.g. $MgSO_4$).

Each panel 1, 1', 1" may extend in a first X and a second Y horizontal direction, preferably being parallel with a respective longitudinal extension of the third 1c and first 1a edge portion, and in a vertical direction Z, preferably being parallel with a thickness direction of the panel, cf. FIGS. 1a, 3a and 6a-6b. The directions X, Y and Z may be perpendicular to each other. These direction attributes may also be valid in an assembled state of the panels, such as of all panels, in which front 11 and/or rear 12 sides of the panels may be provided in parallel.

The locking device 10 comprises a protrusion 2 and a groove 3 configured to cooperate for vertical locking of a first edge portion 1a of a first panel 1 to an adjacent second edge portion 1b of a second panel 1'. The protrusion and the groove are preferably provided in the first 1a and second 1b edge portions, respectively. The protrusion may be integrally formed with the first panel 1, such as in a core 30 thereof.

The protrusion 2 preferably extends horizontally outwards from the panel 1 beyond a vertical plane VP defined in the assembled state of the panels 1, 1' by, preferably engaging, upper portions 1e, 1f of the edge portions 1a, 1b, which is perpendicular to a horizontal plane HP parallel to the front 11 and/or rear side 12 of the panels. The groove 3 preferably extends horizontally inwards of the vertical plane VP, i.e., in a direction and/or position towards a centre of the panel 1'.

A tongue 5 and a recess 4 are provided in the first 1a and second 1b edge portions, respectively, configured to cooperate for horizontal locking of the first 1a and second 1b edge portions, preferably at horizontal locking surfaces 22, 23, cf. FIGS. 1d-1e and 2f. The recess 4 is provided in a strip 6 extending horizontally beyond the upper portion 1f of the second edge portion 1b. Preferably, the recess 4 is provided in an upward facing side 6a of the strip 6. The recess 4 may be provided horizontally inwards of a bulge portion 8 provided on the strip 6. The bulge portion 8 may extend along and/or below a horizontal strip plane HS extending along the upward facing side 6a, such as in an inner portion thereof.

In some embodiments, and as shown in, e.g., FIGS. 1a-1h, 2a-2d, 2g and 9a-9h, the tongue 5 is a separate, preferably flexible, tongue 5a arranged in an insertion groove 7 provided in the first edge portion 1a, and extending along a longitudinal length of the first edge portion 1a, preferably along the horizontal direction Y. The insertion groove 7 may extend at least in the vertical direction Z of the panel 1. The separate tongue 5a comprises a locking portion 5b configured to provide the horizontal locking, preferably by a snapping engagement. A horizontal locking surface 22 of the locking portion 5b may cooperate with a horizontal locking surface 23 of the recess 4, preferably provided at an outer portion 4a thereof. The horizontal locking surfaces 22, 23 may cooperate at planar or curved section(s) of the locking portion 5b and/or the outer portion 4a. At least a portion of the separate tongue 5a, such as the locking portion 5b, may be pivotable P (see, e.g., FIGS. 1a-1c, 1e-1h, 2a-2d and 9a) and/or displaceable Q in the vertical direction Z (see, e.g., FIG. 1d) and may extend at least partially downwards when provided in the insertion groove 7.

Generally herein, and, e.g., shown in FIGS. 1a-1h, 2a-2d, 2g and 9a, the insertion groove 7 may have parallel inner walls 7e, 7f which preferably are inclined inwards by an angle A with respect to the vertical direction Z, cf. FIG. 1e. For example, the angle A may be larger than or equal to 0°, such as 0°-30°, for example 10-20°.

Figure 4B:
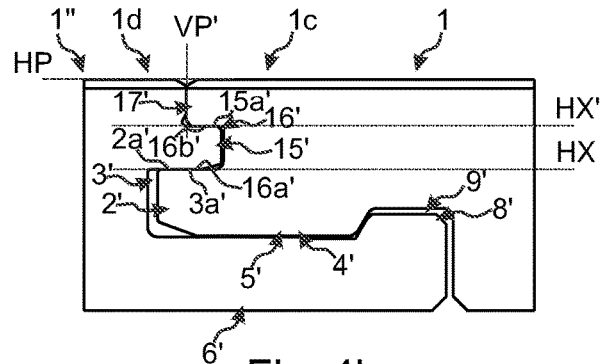

In some embodiments, as shown in, e.g., FIGS. 1a-1c, 1e-1h, 2a-2d, 2g and 9a, an inner portion 5c of the separate tongue 5a may be fixedly arranged in the insertion groove 7 and an outer portion 5d thereof may comprise the locking portion 5b, preferably being pivotable upwards. As illustrated in cross-sectional side views, the separate tongue 5a may be substantially L-shaped, V-shaped, Z-shaped or I-shaped. The outer portion 5d may comprise a displaceable flexible tab 5f. Examples of such a, preferably extruded, separate tongue 5a are shown in FIGS. 4e-4g. Preferably, the separate tongue is mechanically attached to the insertion groove, such as by a press fit.

A width W1 of the inner portion 5c may be smaller than a width W2 of the outer portion 5d as shown in, e.g., FIGS. 1b-1c, 1e-1h, 2a-2d, 4e-4g and 9a. Alternatively, the width W1 may be substantially the same as the width W2, cf., e.g., FIG. 1a. The widths W1, W2 may be determined in a direction DP which is perpendicular to an extension of the, preferably parallel, inner walls 7e, 7f when the separate tongue 5a is inserted therein, cf. FIG. 1e.

In some embodiments, the insertion groove 7 may comprise an inner 7a and an outer 7b portion, wherein the outer portion 7b is wider than the inner portion 7a, see, e.g., FIGS. 1c and 4f-4g. The insertion groove 7 may have parallel inner walls 7e, 7f which for example may extend substantially in parallel with the direction Z. The outer portion 5d may comprise a hook portion 5e configured to be partially provided in the outer portion 7b. The hook portion 5e may comprise the displaceable flexible tab 5f. An advantage of these embodiments is that a displacement degree of the locking portion 5b may be increased. In addition, a wobbling or tilting of the separate tongue may be counteracted. FIGS. 4f-4g also show embodiments in which the separate tongue comprises a notch portion 5g provided in a side wall 5h, preferably such that a wall thickness WT of the separate tongue 5a becomes substantially uniform. Such a notch portion may improve the extrusion process.

Figure 4C:
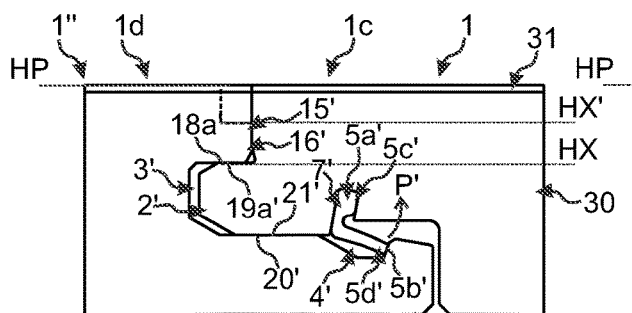
Figure 4D:
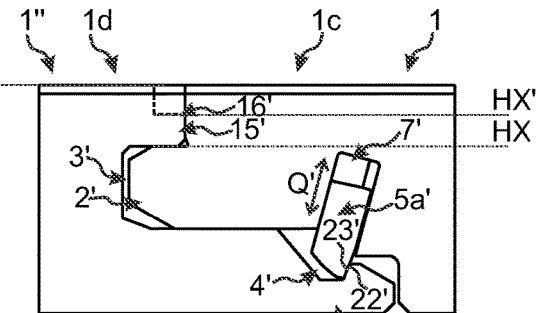
Figure 4E:
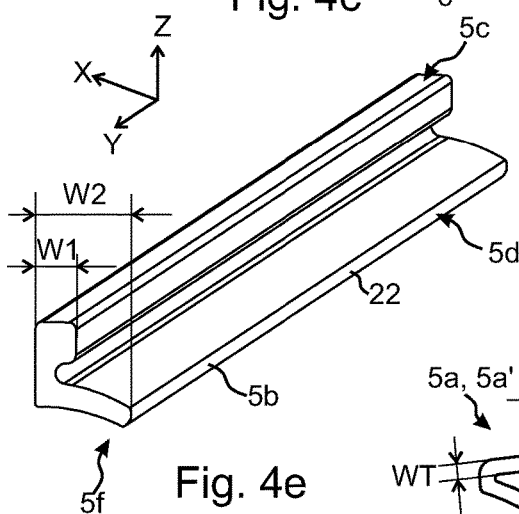
Figure 4F:
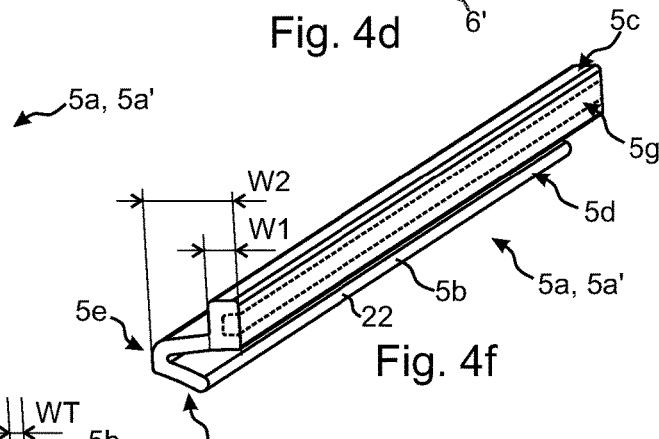
Figure 4G:
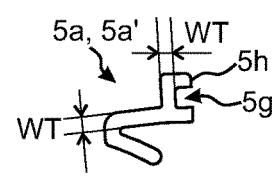
Figure 4H:
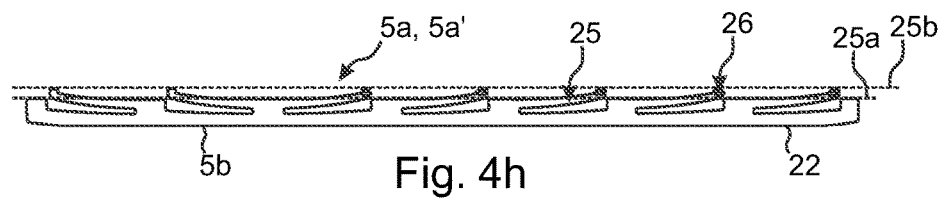

In some embodiments, as shown in, e.g., FIGS. 1d and 4h, at least a portion of the separate tongue 5a may be displaceably arranged in the insertion groove 7. For example, the separate tongue 5a may comprise flexible members 25 that are bendable between an inner 25a and an outer 25b position. Thereby, the separate tongue may be displaceable between an inner and an outer position. An inwardly directed pressure on the separate tongue may displace it inwards toward the inner position and the flexible members 25 may be configured to displace it outwards toward its outer position. For example, the displacement may be caused by virtue of a biasing force of the flexible members. Preferably, the separate tongue is formed by injection moulding. Optionally, the separate tongue 5a comprises at least one friction element 26 for preventing it from being displaced out from the insertion groove.

In any embodiment herein, the separate tongue 5a may be pretensioned against the recess 4. Thereby, a satisfactory horizontal locking may be maintained and/or secured, even if a contingent deformation of the material of the panel would occur, such as due to contamination of a liquid substance.

The insertion groove 7 may be provided horizontally inside of the vertical plane VP. Moreover, the recess 4 may be provided horizontally outside of the vertical plane VP in the assembled state.

Figure 9A:
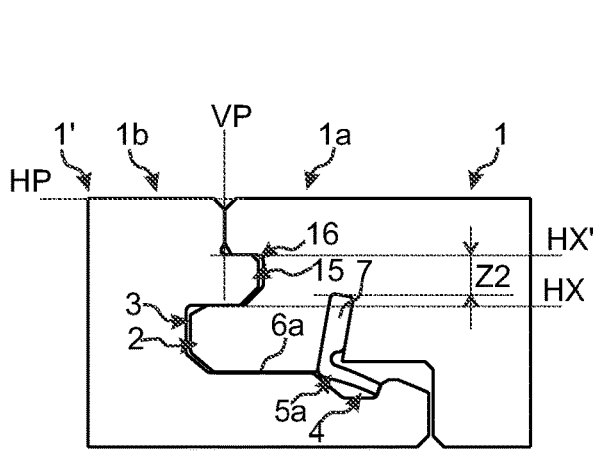
FIGS. 9a-9i illustrate embodiments of a building panel in a cross-sectional side view (FIG. 9a), a perspective view (FIG. 9b) and top views (FIGS. 9c-9i).
Figure 9B:
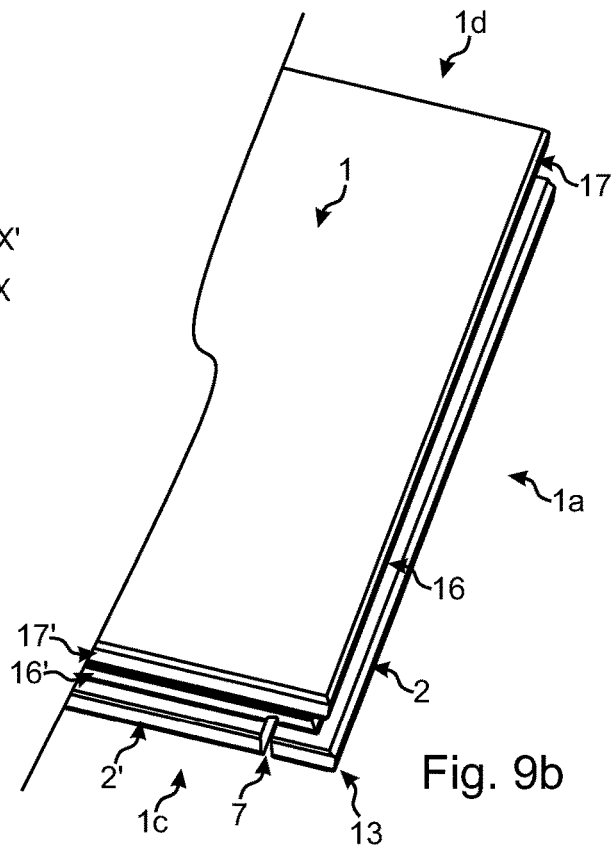
Figure 9C:
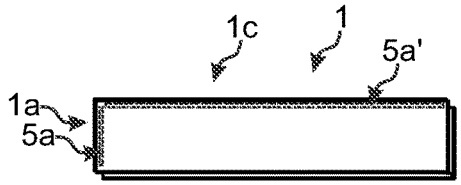
Figure 9D:
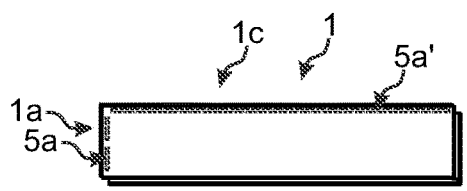
Figure 9E:
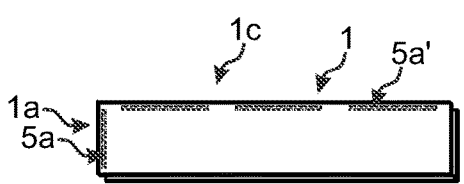
Figure 9F:
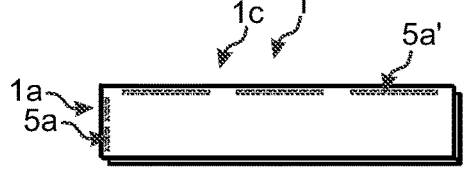
Figure 9G:
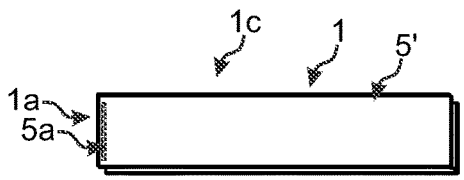
Figure 9H:
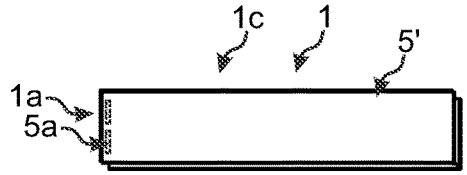
Figure 9I:
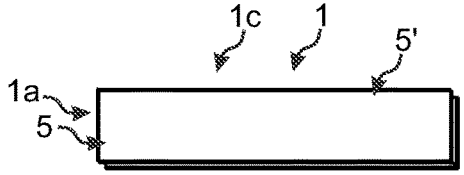

In some embodiments, and as shown in, e.g., FIGS. 2e-2f and 9i, the tongue 5 may be integrally formed with the first panel 1, such as in a core 30 thereof. The tongue 5 may extend vertically downwards and may be horizontally separated from a rear side 12 of the panel 1 by means of an indentation 9. The bulge portion 8 may be provided in the indentation 9 in the assembled state of the panels 1, 1', preferably such that they cooperate with each other for horizontal locking of the first 1a and second 1b edge portions at cooperating horizontal locking surfaces 23, 22, preferably provided at an inner 8a and an outer 9a portion thereof, respectively. The, preferably flexible, strip 6 may comprise an undercut portion 14 configured to accommodate a portion of the strip 6 during a downward bending thereof.

The locking device 10 may comprise a protruding element 2' and a cavity 3' configured to cooperate for vertical locking of a third edge portion 1c of the first panel 1 to an adjacent fourth edge portion 1d of a third panel 1". The protruding element and the cavity are preferably provided in the third 1c and fourth 1d edge portions, respectively. The protruding element may be integrally formed with the first panel 1, such as in a core 30 thereof.

The protruding element 2' preferably extends horizontally outwards beyond a vertical plane VP' defined in an assembled state of the panels 1, 1" by, preferably engaging, upper portions 1g, 1h of the edge portions 1c, 1d, which is perpendicular to the horizontal plane HP. The cavity 3' preferably extends horizontally inwards of the vertical plane VP', i.e., in a direction and/or position towards a centre of the panel 1".

The third 1c and fourth 1d edge portions may comprise a, preferably downwardly open, locking groove 9' and a locking element 8', respectively. The locking element 8' may be provided in a strip 6' extending horizontally beyond the upper portion 1h of the fourth edge portion 1d. Preferably, the locking element 8' is provided in an upward facing side 6a' of the strip 6' and extends vertically upwards. The locking element 8' may extend along and/or below a horizontal strip plane HS' extending along the upward facing side 6a', such as in an inner portion thereof. In some embodiments, however, it may extend above horizontal strip plane HS', cf. FIG. 3d. The locking element 8' and the locking groove 9' may cooperate for horizontal locking of the third 1c and fourth 1d edge portions at horizontal locking surfaces 22', 23', preferably provided at an inner 8a' and an outer 9a' portion thereof, respectively.

A prominence 5' may be provided horizontally outwards of the locking groove 9' and a depression 4' may be provided horizontally inwards of the locking element 8'.

In some embodiments, and as shown in, e.g., FIGS. 3a-3h, 4a-4b, 8c and 9g-9i, the prominence 5' may be integrally formed with the first panel 1, such as in a core 30 thereof. The prominence 5' may extend vertically downwards and may be horizontally separated from a rear side 12 of the panel 1 by means of the locking groove 9'. In some embodiments, an underside 24' of the prominence 5' may be essentially planar, cf. FIG. 3d. The, preferably flexible, strip 6' may comprise an undercut portion 14' configured to accommodate a portion of the strip 6' during a downward bending of the strip 6'.

In some embodiments, and as shown in, e.g., FIGS. 4c-4d and 9c-9f, the prominence 5' may be, or may comprise, a separate, preferably flexible, locking member 5a' arranged in an insertion member 7' provided in the third edge portion 1c. Embodiments of the locking member 5a', such as of a locking portion 5b', an inner 5c' and an outer 5d' portion, and/or the insertion member 7', may be the same as for the separate tongue 5a, such as of the locking portion 5b and the inner 5c and outer 5d portion, and/or the insertion groove 7, whereby reference is made thereto for details. In particular, at least a portion of the locking member 5a', such as a locking portion 5b', may be pivotable P' and/or displaceable Q'. FIGS. 4e-4h illustrate embodiments of the locking member 5a'. Also, embodiments of a depression 4' configured to cooperate with the locking member 5a' may be the same as for the recess 4, whereby reference is made thereto for details.

In some embodiments, the first 1a and the third 1c edge portions comprise a separate tongue 5a and a separate locking member 5a', respectively, such as disclosed in any of FIGS. 1a-1h, 2a-2d, 2g and 9a combined with any of FIGS. 4c-4d and 9c-9f. In a first example, the separate tongue 5a and the locking member 5a' are fixedly arranged in the insertion grooves 7, 7', preferably such that, during locking, the inner portion 5c thereof remain fixed in the insertion grooves 7, 7' and the outer portion 5d is displaced. In a second example, they are displaceably arranged therein.

It is emphasized that any of the embodiments of the edge portions 1c, 1d in FIGS. 3a-3h, 4a-4d and 8c may be combined with any of the embodiments of the edge portions 1a, 1b in FIGS. 1a-1h, 2a-2g and 9a-9b. Any of these combinations may be implemented as in FIGS. 9c-9i, when consistent therewith.

The panels may be arranged in a pattern. In the assembled state, the panels may be arranged with their long edge portions in parallel as illustrated in, e.g., FIG. 5e. In some embodiments, the panels may be arranged in a non-parallel pattern in which at least some of the, say, long edge portions are not provided in parallel, such as a herringbone pattern. As shown in, e.g., FIG. 6a, the panels may comprise a first 27 and a second 28 set of panels, commonly referred to as A- and B-panels. The first 1a and second 1b edge portions of the first 27 (second 28) set may be short (long) edge portions and the third 1c and fourth 1d edge portions may be long (short) edge portions. In the assembled state, the panels of the respective set 27, 28 may be arranged with their long edge portions in parallel and the long edge portions of the first set 27 may be arranged perpendicularly to the long edge portions of the second set 28.

Generally herein, and as illustrated in the embodiments in, e.g., FIGS. 1g, 2c, 5a and 6a, the first 1a and second 1b edge portions may be assembled by a relative essentially horizontal, preferably linear, displacement of the first 1 and second 1' panels against each other (arrow D), preferably by snapping. The first panel may be displaced towards the second panel (arrow Da) and/or the second panel may be displaced towards the first panel (arrow Db). Alternatively, or additionally, they may be assembled by angling (arrow R) of the first 1 and second 1' panels relative to each other, see, e.g., FIGS. 1h, 2d and 6a. The relative essentially horizontal displacement may be preferred when the first 1a and second 1b edge portions are short edge portions, see, e.g., FIG. 5a, but is equally conceivable when at least one of them is a long edge portion, see, e.g., FIG. 6a.

Figure 5A:
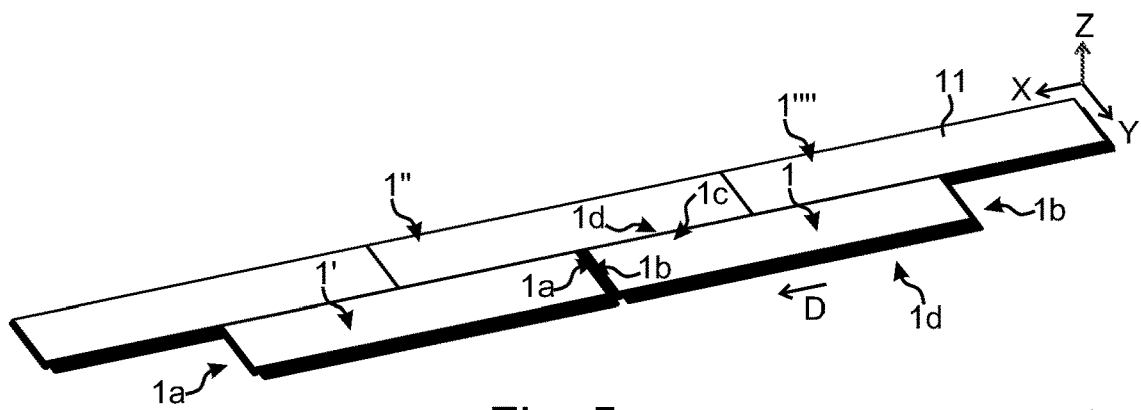
FIGS. 5a-5e illustrate embodiments of an assembly of building panels.
Figure 5B:
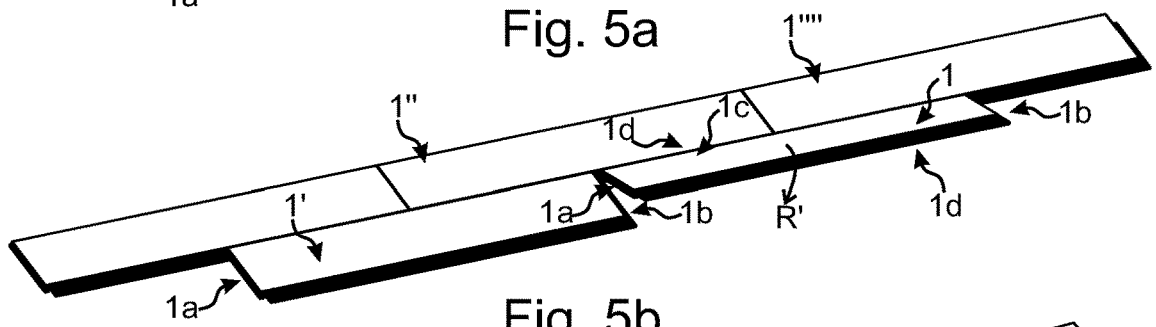
Figure 6A:
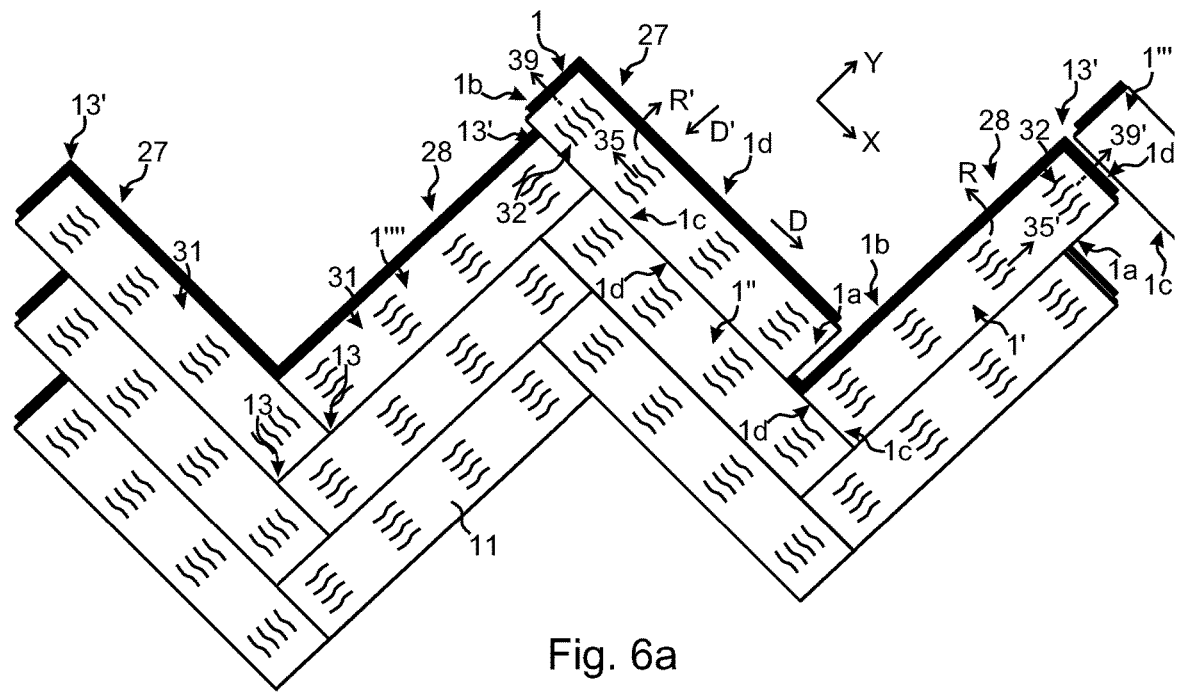
FIGS. 6a-6d illustrate an embodiment of an assembly of, as well as assembled, building panels (FIG. 6a) and an embodiment of a building panel in a top view (FIG. 6b) and zoomed-in top views (FIGS. 6c-6d).
Figure 6B:
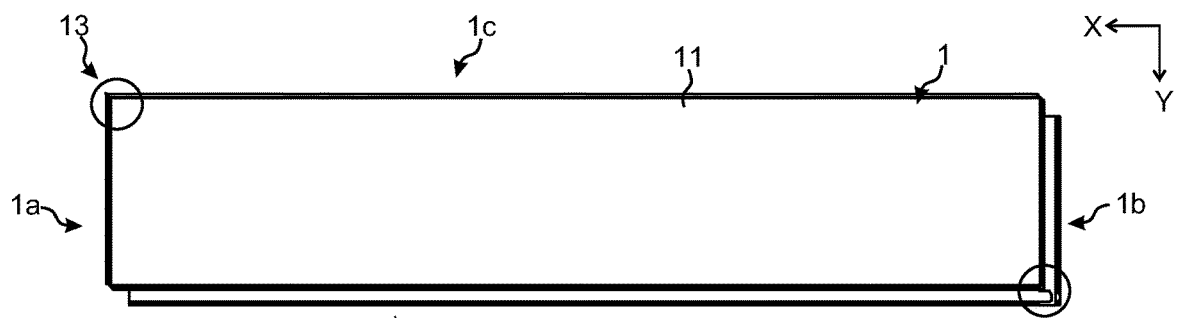
Figure 6C:
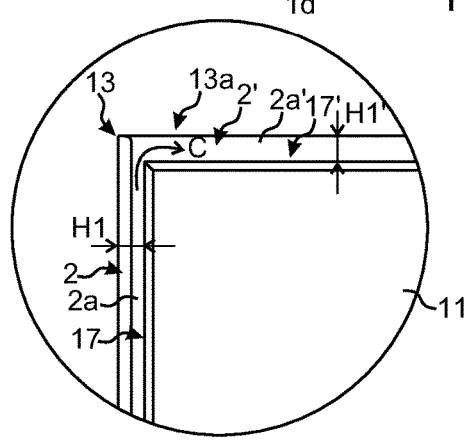
Figure 6D:
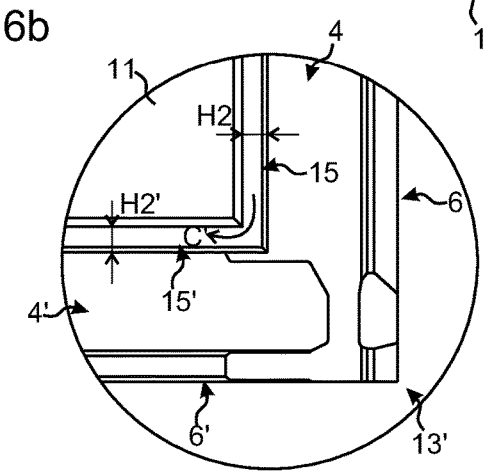
Figure 7A:
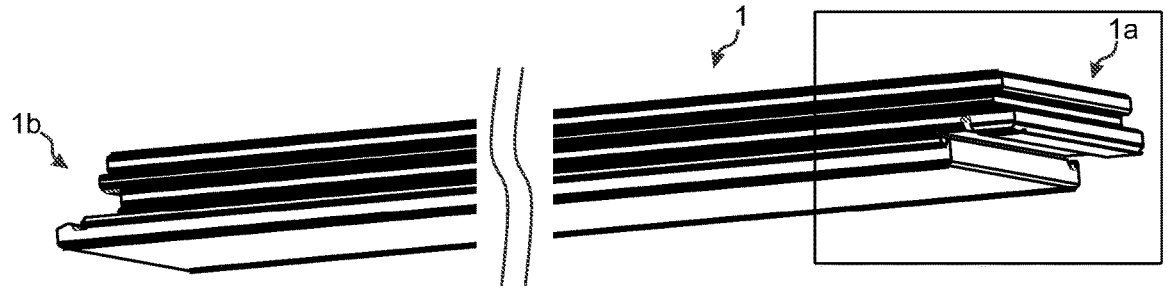
FIGS. 7a-7d illustrate embodiments of a building panel in perspective views (FIGS. 7a and 7c) and zoomed-in perspective views (FIGS. 7b and 7d).
Figure 7B:
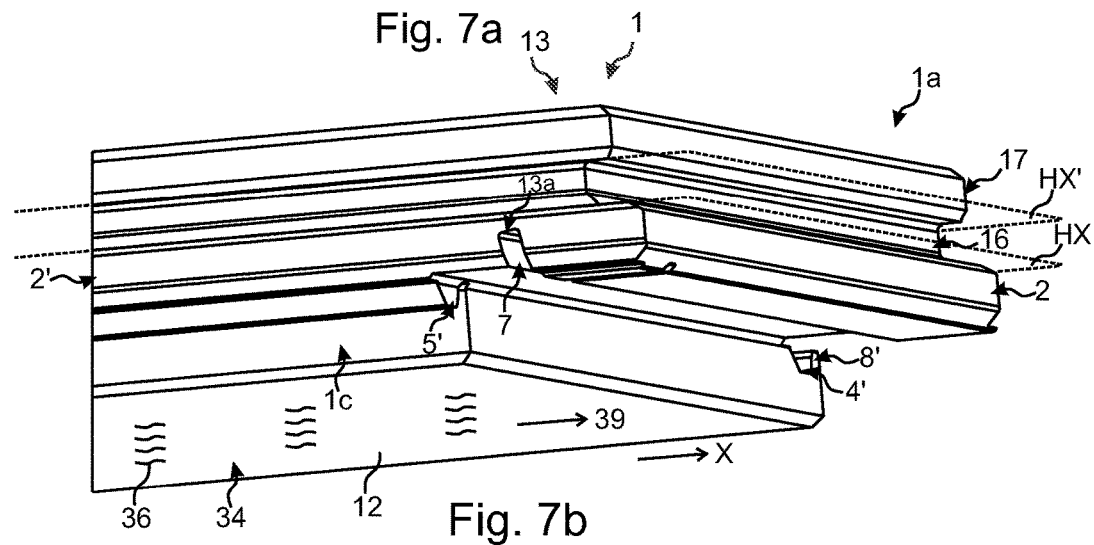
Figure 7C:
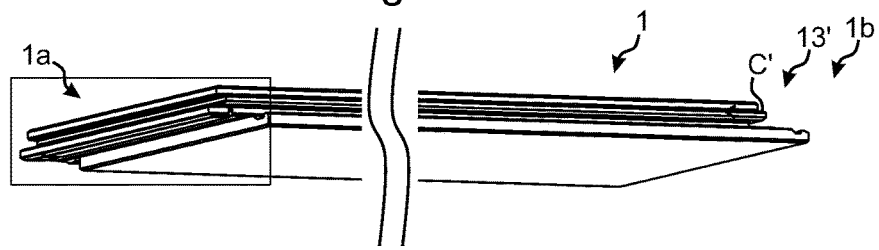
Figure 7D:
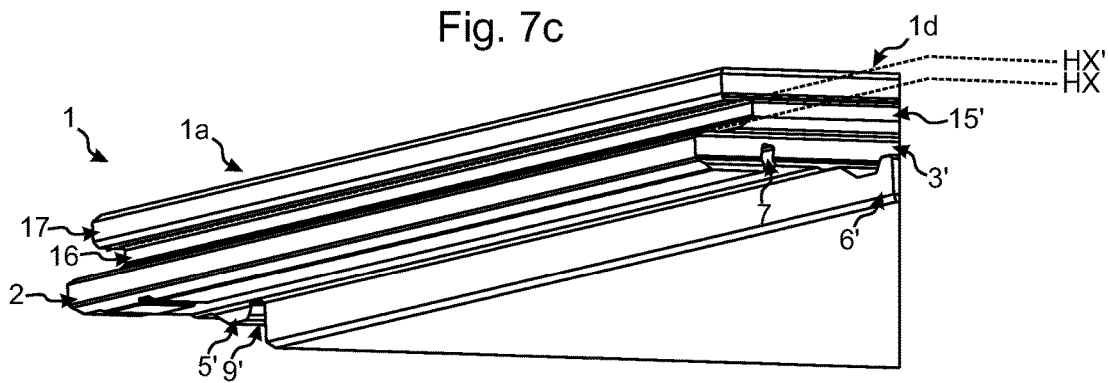

In a similar manner, as shown in the embodiments in, e.g., FIGS. 5b and 6a, a third edge portion 1c of the first panel 1 and a fourth edge portion 1d of a third panel 1" may be assembled by angling of the first 1 and third 1" panels relative to each other (arrow R').

Figure 5C:
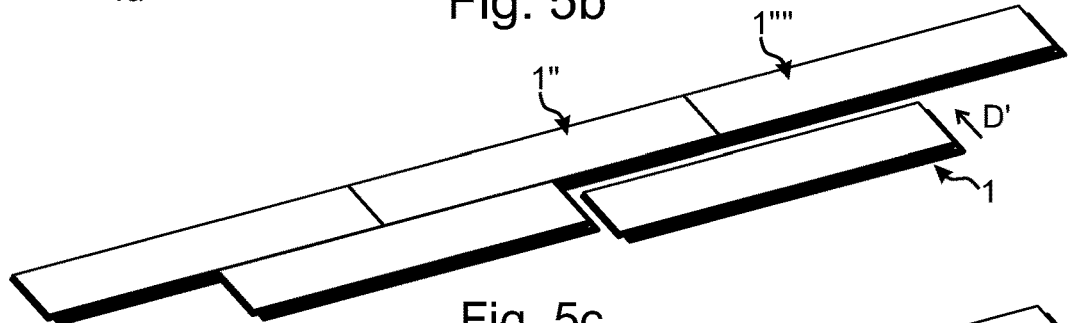

Alternatively, or additionally, they may be assembled by a relative essentially horizontal, preferably linear, displacement of the first 1 and third 1" panels against each other (arrow D'), preferably by snapping, see, e.g., FIGS. 5c and 6a. For example, in any embodiment above, the third 1c and fourth 1d edge portions may be long edge portions, see, e.g., FIGS. 5a-5e and FIG. 6a (first set 27) or short edge portions, see, e.g., FIG. 6a (second set 28).

Figure 5D:
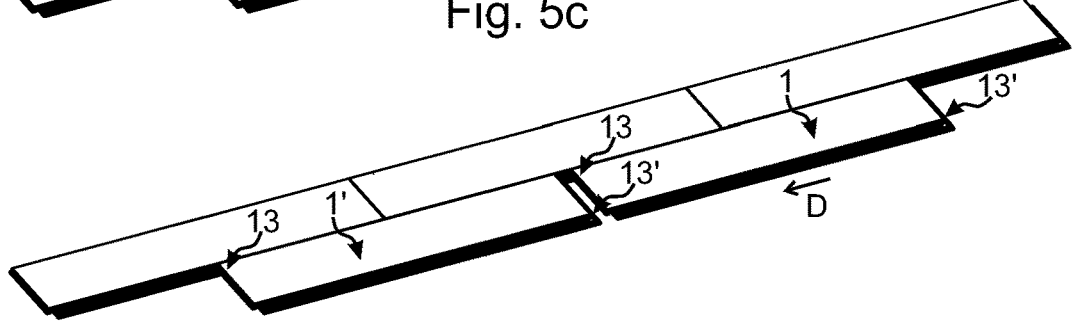

By assembling the first panel 1 to a previously assembled third panel 1", and optionally another, say fifth, panel 1"", such that the corresponding protruding element 2' cooperates with the cavity 3', the first panel 1 may be disposed substantially in parallel with a previously assembled second panel 1', cf. FIGS. 5a, 5d and 6a. This may simplify the horizontal displacement D of the first edge portion 1a of the first panel 1 against the second edge portion 1b of the second panel 1'.

FIGS. 2a-2d, 2f-2g, 6b-6d, 7a-7d, 8a-8b and 9a-9b illustrate embodiments in which the first 1a and second 1b edge portions further comprise a lip groove 16 and a lip 15, respectively, configured to cooperate with each other for vertical locking of the first and second edge portions. The lip 15 and/or the lip groove 16 may extend along a major portion, preferably essentially an entirety, of the second 1b and/or first 1a edge portion(s). The lip 15 may be provided above the groove 3 and the lip groove 16 may be provided between the protrusion 2 and an upper shoulder portion 17 provided in the first edge portion 1a. The protrusion 2 may extend horizontally beyond the upper shoulder portion 17. Moreover, the lip 15 may extend horizontally outwards beyond the vertical plane VP.

Analogously, FIGS. 3h, 4a-4b, 6b-6d, 7a-7d, 8a-8c and 9a-9b illustrate embodiments in which the third 1c and fourth 1d edge portions further comprise a female 16' and a male 15' connector, respectively, configured to cooperate with each other for vertical locking of the third and fourth edge portions. The male 15' and/or the female 16' connector(s) may extend along a major portion, preferably essentially an entirety, of the fourth 1d and/or third 1c edge portion(s). The male connector 15' may be provided above the cavity 3' and the female connector 16' may be provided between the protruding element 2' and a projection 17' provided in the third edge portion 1c. The protruding element 2' may extend horizontally beyond the projection 17'. Moreover, the male connector 15' may extend horizontally outwards beyond the vertical plane VP'.

It is stressed that the lip 15 and lip groove 16 and/or the male 15' and female 16' connectors may optionally be included in any embodiment disclosed herein. This is schematically indicated by the dashed lines in, e.g., FIGS. 1e-1f, 3e-3f and 4c-4d.

It is noted that the edge portions 1a, 1b, 1c, 1d in any of FIGS. 5a-5e, 6a-6d, 7a-7d and 8a-8b may be embodied as the edge portions illustrated in any of, e.g., FIGS. 1e-1f, 2a-2d, 2f-2g, 3e-3f, 3h, 4a-4d and 8c. In other embodiments, the lip 15 and lip groove 16 and the male 15' and female 16' connectors may be missing from the panel 1, but other features and characteristics of the panel including the locking device 10 may be similar as those in, e.g., FIGS. 7a-7d and 8a-8b.

A top side 2a of the protrusion 2 comprises a vertical locking surface 18a configured to cooperate with a vertical locking surface 19a provided in an upper groove wall 3a of the groove 3, see, e.g., FIGS. 1a-1b and FIG. 2a together with its sectional side view in FIG. 2b or FIG. 2g. At least a portion of the top side 2a may be substantially parallel to the horizontal plane HP. Alternatively, the top side 2a may be curved or inclined with respect to the horizontal plane HP.

In some embodiments, such as illustrated in FIGS. 1a-1h, 2e and 2g, a lower side 2b of the protrusion 2 may comprise a vertical locking surface 20 configured to cooperate with a vertical locking surface 21 provided in a lower groove wall 3b of the groove 3 and/or in the upward facing side 6a, cf. FIGS. 1a-1b. Hence, the vertical locking surfaces 18a, 19a and 20, 21 may cooperate with each other for providing the vertical locking. Also, a seal may be provided at these cooperating surfaces. Preferably, at least a portion of the upper 3a and lower 3b groove walls are substantially parallel to the horizontal plane HP.

In some embodiments, such as illustrated in FIGS. 1e-1f, 2a-2d, 2f and 9a, a top wall 16b of the lip groove 16 comprises a vertical locking surface 18b configured to cooperate with a vertical locking surface 19b provided in an upper section 15a of the lip 15, cf. FIGS. 2a-2b. Preferably, when such vertical locking surfaces 18a, 19a and 18b, 19b cooperate with each other, the lower side 2b is separated from the lower groove wall 3b and/or the upward facing side 6a by a space S, cf. FIG. 2b. In some embodiments, however, for example in any of FIGS. 1e-1f, 2a and 2f, the lower side 2b may engage with the lower groove wall 3b and/or the upward facing side 6a, cf. FIG. 2g.

An upper side 2a' of the protruding element 2' comprises a vertical locking surface 18a' configured to cooperate with a vertical locking surface 19a' provided in an upper wall 3a' of the cavity 3', see, e.g., FIGS. 3a-3b, 4a-4b and 8c. At least a portion of the upper side 2a' may be substantially parallel to the horizontal plane HP. When the upper side 2a' is curved or inclined with respect to the horizontal plane HP, the insertion groove 7 preferably is provided below a lowermost section of the inclined upper side 2a'.

In some embodiments, such as illustrated in FIGS. 3a-3g, 4c-4d and 8c, a lower side 2b' of the protruding element 2' comprises a vertical locking surface 20' configured to cooperate with a vertical locking surface 21' provided in a lower wall 3b' of the cavity 3' and/or in the upward facing side 6a', cf. FIGS. 3a-3b and 4c. Hence, the vertical locking surfaces 18a', 19a' and 20', 21' may cooperate with each other for providing the vertical locking. Preferably, at least a portion of the upper 3a' and lower 3b' walls are substantially parallel to the horizontal plane HP.

In some embodiments, such as illustrated in FIGS. 3e-3f, 3h, 4a-4d and 8c, an upper wall 16b' of the female connector 16' comprises a vertical locking surface 18b' configured to cooperate with a vertical locking surface 19b' provided in an upper portion 15a' of the male connector 15', cf. FIGS. 4a-4b. Preferably, when such vertical locking surfaces 18a', 19a' and 18b', 19b' cooperate with each other, the lower side 2b' is separated from the lower wall 3b' and/or the upward facing side 6a' by a space S', cf. FIG. 4a. In some embodiments, however, for example in any of FIGS. 3e-3f, 3h and 4b-4d, the lower side 2b' may engage with the lower wall 3b' and/or the upward facing side 6a', cf. FIG. 8c.

In preferred embodiments, the locking device 10 provided in the first 1a and second 1b edge portions comprising a protrusion 2 and a groove 3, as shown in, e.g., FIGS. 1a-1h and 2e, may be combined with the locking device 10 provided on the third 1c and fourth 1d edge portions comprising the protruding element 2' and the cavity 3' as shown in, e.g., FIGS. 3a-3g and 4c-4d. Alternatively, it may be combined with the locking device provided on the third and fourth edge portions comprising the protruding element and the cavity as well as the male 15' and female 16' connectors, as shown in, e.g., FIGS. 3e-3f, 3h, 4a-4d and 8c.

In some embodiments, the locking device 10 provided in the first 1a and second 1b edge portions comprising a protrusion 2 and a groove 3 as well as the lip 15 and lip groove 16, as shown in, e.g., FIGS. 1e-1f, 2a-2d, 2f-2g and 9a, may be combined with the locking device 10 provided on the third 1c and fourth 1d edge portions comprising the protruding element 2' and the cavity 3' as shown in, e.g., FIGS. 3a-3g and 4c-4d. Preferably, however, it may be combined with the locking device provided on the third and fourth edge portions comprising the protruding element and the cavity as well as the male 15' and female 16' connectors, as shown in, e.g., FIGS. 3e-3f, 3h, 4a-4d and 8c.

Generally herein, an assembly by a relative essentially horizontal displacement of the first 1a and second 1b edge portions, such as in any of FIGS. 1a-1h, 2a-2g, 5a and 5d, may be combined with an assembly by a relative essentially horizontal displacement and/or angling of the third 1c and fourth 1d edge portions, such as in any of FIGS. 3a-3h, 4a-4d, 5b-5c and 8c. The first and second edge portions may be assembled before or after the third and fourth edge portions.

In preferred embodiments, the insertion groove 7 is provided vertically below at least one horizontal plane HX, HX' extending along a vertical locking surface 18a', 18b' provided in a third edge portion 1c of the first building panel 1, as illustrated in, e.g., FIGS. 3a-3h, 4a-4d, 7b, 7d and 8c. The position of the horizontal plane(s) HX, HX' along the first 1a and second 1b edge portions is illustrated in FIGS. 1a-1f, 2a, 2e-2f and 9a.

In, for example, FIGS. 1a-1f, 2a-2b and 2g, the insertion groove 7 is provided vertically below a horizontal plane HX extending along the upper side 2a', which comprises the vertical locking surface 18a'. Thereby, a vertically innermost portion 7a of the insertion groove 7 may be spaced from the horizontal plane HX by a distance Z1, cf. FIG. 1a. In non-limiting examples, the space Z1 may be at least 0.1 mm, preferably at least 0.5 mm. These features can help improve sealing capabilities of the assembled panels.

In some embodiments, and as shown in, e.g., FIG. 1f (see dashed line 7d) and FIGS. 9a-9b, the insertion groove 7 may be provided vertically above the horizontal plane HX, but vertically below a horizontal plane HX' extending along the upper wall 16b', which comprises the vertical locking surface 18b'. Thereby, the vertically innermost portion 7a may be spaced from the horizontal plane HX' by a distance Z2, cf. FIG. 9a. In non-limiting examples, the space Z2 may be at least 0.1 mm, preferably at least 0.5 mm. It is noted that even though the protruding element 2' may become fully penetrated by the insertion groove 7 along the third edge portion 1c the male connector 15' may be continuous along the fourth edge portion 1d, since the upper portion 15a' may be provided along the horizontal plane HX', cf. FIGS. 6b-6d, 7d and 8a. These features can help improve sealing capabilities of the assembled panels.

By means of the insertion groove 7 being provided vertically below the horizontal plane HX, the protrusion 2 and the protruding element 2' may extend continuously along a corner portion 13 of each panel such that the protrusion 2 is gradually transformed into the protruding element 2' along a continuous transition portion C, such as a horizontal curve, disposed along the corner portion 13, see, e.g., FIGS. 5d-5e, 6a-6c and 8b. The continuous transition portion C may be provided in a horizontal transition plane HC, such as a horizontal curve plane, which is parallel with the horizontal plane HP, and which preferably is provided along the horizontal plane HX or vertically between the horizontal plane HX and the innermost portion 7a, cf. FIGS. 1a, 1c and 8b. For example, the top side 2a may be gradually transformed into the upper side 2a'. The corner portion 13 may be provided horizontally outside of the tongue 5, such as the separate tongue 5a and/or the insertion groove 7, along the horizontal direction X and horizontally outside of the locking groove 9' along the horizontal direction Y. Preferably, the top side 2a is also provided along the horizontal plane HX and/or the top wall 16b is provided along the horizontal plane HX', cf. the illustrations in FIGS. 1a, 1d-1f and 2a-2b. Thereby, the protrusion 2 and the protruding element 2' may be provided at the same vertical levels. Clearly, the continuously extending protrusion 2 and protruding element 2' are equally conceivable in any of the embodiments described in relation to, e.g., FIGS. 1a-1h and 2e combined with any of, e.g., FIGS. 3a-3g and 4c-4d, without any male 15' and female 16' connectors.

The lip 15, such as the upper section 15a, and the male connector 15', such as the upper portion 15a', may be provided at the same vertical level and/or the lip groove 16, such as a lower section 16a thereof, and the female connector 16', such as a lower portion 16a' thereof, may be provided at the same vertical level.

In some embodiments, however, the protrusion 2 and the protruding element 2' may be provided at different vertical levels, preferably while the insertion groove 7 is provided vertically below the horizontal plane HX. In a first example, and as shown in, e.g., FIG. 1e combined with FIG. 3e, the top side 2a may be provided above the horizontal plane HX. In a second example, and as shown in, e.g., FIG. 1f combined with FIG. 3f, the top side 2a may be provided below the horizontal plane HX. It is noted that in some embodiments the insertion groove 7 may be provided below the horizontal plane HX while extending above a horizontal plane HA extending along the top side 2a, cf. FIG. 1f (unbroken line). Such a configuration may still provide a seal on the third edge portion 1c at the vertical locking surfaces 18a', 19a'. Optionally, any of the embodiments in FIGS. 1e-1f and 3e-3f may comprise a lip 15 and a lip groove 16 and/or the male 15' and female 16' connectors (see dashed lines). In some embodiments, in which the locking device 10 comprises male 15' and female 16' connectors, the top side 2a may be provided above the horizontal plane HX, see dashed extension 7d of the insertion groove in FIG. 1f, but below the horizontal plane HX', cf. FIGS. 3f and 9a-9b.

A horizontal extension H1, H1' of the protrusion 2 and/or the protruding element 2', such as from the vertical plane VP, VP', may be essentially constant along the first 1a and/or the third 1c edge portion(s) in the corner portion 13, and preferably along essentially the entirety of the first and/or the third edge portion(s). Moreover, a cross-section of the groove 3 and/or cavity 3' may be essentially constant along the second 1b and/or the fourth 1c edge portion(s) in the corner portion 13, and preferably along essentially the entirety of the second and/or the fourth edge portion(s). The thickness of the protrusion 2 and/or the protruding element 2' may be constant along the corner portion 13, preferably along essentially the entire first 1a and/or the third 1c edge portion(s), except at a location 13a where the insertion groove 7 penetrates the third edge portion 1c, cf. FIGS. 6c and 7b.

Clearly, in embodiments, such as in FIGS. 1e-1f, 2a-2b, 2f-2g, 3e-3f, 3h, 4a-4d, 6b-6d, 7a-7d, 8a-8c and 9a-9i, the upper shoulder portion 17 and the projection 17' may extend continuously along the corner portion 13, preferably such that they each have a constant thickness along the corner portion 13. Furthermore, the lip 15 and the male connector 15' may extend continuously along a corner section 13' provided where the second 1b and the fourth 1d edge portions meet, see, e.g., FIGS. 5d-5e, 6a-6b and 6d, preferably such that the male connector is gradually transformed into the lip along a continuous transition portion C', such as a horizontal curve, disposed along the corner section 13'. The continuous transition portion C' may be provided in the horizontal transition plane HC, such as the horizontal curve plane. The corner section 13' may be provided horizontally outside of an innermost portion 3c of the groove 3 and, in a perpendicular direction, horizontally outside of an innermost portion 3c' of the cavity 3', cf. FIGS. 2b and 4a. A horizontal extension H2, H2' such as from the vertical plane VP, VP', of the lip 15 and/or the male connector 15' may be essentially constant along the second 1b and/or the fourth 1d edge portion(s) in the corner section 13', and preferably along essentially the entirety of the second and/or the fourth edge portion(s), cf. FIGS. 2b and 3h.

Figure 5E:
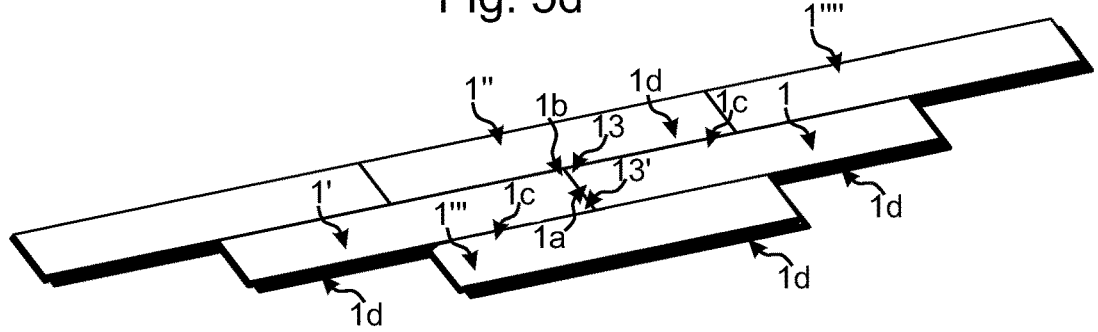

It is noted that FIGS. 5e and 6a also illustrate embodiments of assembled panels 1, 1', 1", 1''' in accordance with the second aspect, including a protrusion 2 in the first edge portion 1a of the first panel 1, a groove 3 in the second edge portion 1b of the second panel 1', and a protruding element 2' in a third edge portion 1c of the first panel 1, and optionally a lip groove 16 in the first edge portion 1a of the first panel 1, a lip 15 in the second edge portion 1b of the second panel 1', and a male connector 15' in a fourth edge portion 1d of a second panel 1'. By means of the protruding element 2', the third edge portion 1c of the first panel 1 may be vertically locked to a fourth edge portion 1d of a third panel 1" by cooperation with a cavity 3'. By means of the male connector 15', the fourth edge portion 1d of the second panel 1' may be vertically locked to a third edge portion 1c of a fourth panel 1''' by cooperation with a female connector 16'. A part of such a fourth panel 1''', belonging to the first set 27, is shown in FIG. 6a.

It is clear that embodiments where the tongue 5 and prominence 5' are integrally formed are included in the second aspect, see, e.g., FIG. 9i, and that embodiments of the corner portion 13, corner section 13', edge portions 1a-1d may be similar to the ones above, but without the insertion groove, recess, insertion member and depression. In particular, the embodiments of the protrusion 2 and/or the protruding element 2', and optionally the lip 15 and/or the male connector 15', may be the same.

Non-limiting schematic embodiments of combinations of the tongue 5, such as the separate tongue(s) 5a, and of the prominence 5', such as the locking member(s) 5a', are displayed in FIGS. 9c-9h. In any embodiment herein, a single separate tongue 5a may extend along at least a portion of the longitudinal extension of the first edge portion 1a, such as along substantially its entirety, see FIGS. 9c, 9e and 9g. Alternatively, at least two separate tongues 5a may extend along at least a portion of the first edge portion, such as along substantially its entirety, see FIGS. 9d, 9f and 9h. Any of these embodiments are equally conceivable for the locking member 5a' that may be provided in the third edge portion 1c, see FIGS. 9c-9f. In FIGS. 9g-9h, the prominence 5' is integrally formed with the panel 1, and may be embodied as in any of the embodiments in, e.g., FIGS. 3a-3h, 4a-4b and 8c.

In any embodiment herein, the panels may comprise a core 30 and a top layer 31 comprising wood fibres 32, see, e.g., FIGS. 1a, 2a, 3a, 4a and 6a. For example, the core 30 may comprise wood fibres 33, e.g., comprising an HDF board, and the top layer 31 may comprise a wood lamella layer or a veneer layer. When the panels are configured to be arranged in a non-parallel pattern, such as a herringbone pattern, thereby comprising a first 27 and a second 28 set of panels as described above, a fibre orientation 35, 35' of at least a portion of the wood fibres 32 of the first 1 and second 1' panels may be provided mainly perpendicularly to each other in an assembled state of the panels, see the schematic illustration in FIG. 6a where the fibre orientations 35, 35' are arranged in parallel with the horizontal directions X, Y.

Thereby, a short edge portion may be assembled to a long edge portion, and a deformation of the short edge portion, such as a first 1a (first set 27) and/or a third 1c (second set 28) edge portion illustrated in FIG. 6a, may be counteracted by means of the locking device 10 comprising a protrusion 2 and a groove 3 and/or a protruding element 2' and a cavity 3'. Embodiments of these elements of the locking device, optionally comprising a lip 15 and a lip groove 16 and/or a male 15' and a female 16' connector, have been described elsewhere herein, such as in relation to FIGS. 1a-1h, 2a-2g, 3a-3h, 4a-4h, 6b-6d, 7a-7d, 8a-8c and 9a-9h, and reference is made thereto for details. Preferably, the protrusion and groove and the protruding element and cavity and, optionally the lip and lip groove and the male and female connectors, are formed in the core 30. Thereby, the locking device may become even stronger.

The fibre orientation 35, 35' of the wood fibres 32 of each of the top layers 31 of the panels 1, 1', 1" may be essentially parallel with their respective long edge portions. A longitudinal extension of the short edge portions may be larger than 7 cm, preferably larger than 8 cm, more preferably larger than 10 cm, and a longitudinal extension of the long edge portions may be smaller than 1.5 m, preferably smaller than 1.0 m.

In preferred embodiments, a thickness of the wood lamella layer and the veneer layer may be less than 3 mm and less than 1 mm, respectively. Optionally, the top layer 31 comprising the veneer layer may further comprise a powder layer 37, preferably comprising wood fibres and a binder, such as a thermosetting resin, e.g., a melamine formaldehyde resin, and, optionally, pigments, cf. FIG. 1a. Yet optionally, the powder may comprise wear-resistant particles, such as aluminum oxide particles. The powder layer may be provided under the veneer layer. For example, the top layer comprising the wood lamella layer may provide a parquet floor panel and the top layer comprising the veneer layer may provide a veneer-wood floor panel or a so-called Woodura™ floor panel.

As shown in, e.g., FIGS. 1a, 2a, 3a, 4a, 6a and 7b, the panels 1, 1', 1" may further comprise a, preferably wood based, balancing layer 34, that may have a fibre orientation 39, 39' and/or thickness similar to the top layer 31. For example, when the top layer 31 comprises a veneer layer and, optionally, a powder layer 37, the balancing layer may also comprise a veneer layer and, optionally, a similar powder layer 38, and the thickness of the veneer layer preferably is less than 1 mm. Moreover, when the top layer 31 comprises a wood lamella layer, the balancing layer may also comprise a wood lamella layer, preferably having a thickness which is less than 3 mm. In any of these examples, the fibre orientation 39, 39' of the wood fibres 36 of the balancing layer 34 may be essentially parallel with the long edge portion of the respective panel 1, 1'. The different layers 30, 31 and optionally the powder layer(s) 37, 38 and/or the balancing layer 34, may be pressed, preferably under heat, for forming a panel comprising a decorative layer.

The disclosure has mainly been described above with reference to a few embodiments. However, as is readily appreciated by a person skilled in the art, other embodiments than the ones disclosed above are equally possible within the scope of the disclosure. For example, in some embodiments, an adhesive 29, 29' may be provided between the first 1a and second 1b edge portions and/or the third 1c and/or fourth 1d edge portions for further improving the locking strength of the locking device 10, e.g., FIGS. 1e and 3e. Moreover, it is clear that embodiments and examples of the first panel 1 disclosed herein are equally conceivable for any of the other panels 1', 1", etc. In addition, in some exemplary embodiments, FIGS. 1a-1h, 2a-2g, 3a-3h, 4a-4h, 5a-5e, 6a-6d, 7a-7d, 8a-8c and 9a-9b represent drawings that are drawn to scale.

Embodiments

Item 1. Building panels, such as floor panels, comprising a locking device (10), the locking device comprising:
a protrusion (2) and a groove (3) and/or a lip groove (16) and a lip (15) configured to cooperate for vertical locking of a first edge portion (1a) of a first building panel (1) to an adjacent second edge portion (1b) of a second building panel (1'), the protrusion and/or the lip groove and the groove and/or the lip being provided in the first and the second edge portion, respectively, and
a tongue (5) provided in said first edge portion (1a) and a recess (4) provided in a strip (6) of the second edge portion (1b) extending horizontally beyond an upper portion (1f) of the second edge portion, the recess and the tongue being configured to cooperate for horizontal locking of the first and the second edge portions,
the first (1a) and second (1b) edge portions being configured to be assembled to each other by a relative essentially horizontal displacement of the first (1) and second (1') building panels against each other, preferably by snapping, and/or by angling of the first and second building panels relative to each other, and
a protruding element (2') provided in a third edge portion (1c) of the first building panel (1) for vertical locking of the third edge portion (1c) to an adjacent fourth edge portion (1d) of a third building panel (1"), such as by angling of the first (1) and third (1") building panels relative to each other and/or by a relative essentially horizontal displacement of the first and third building panels against each other, preferably by snapping, and/or
a male connector (15') provided in a fourth edge portion (1d) of the second building panel (1') for vertical locking of the fourth edge portion to an adjacent third edge portion (1c) of a fourth building panel (1'''), such as by angling of the second (1') and fourth (1''') building panels relative to each other and/or by a relative essentially horizontal displacement of the second and fourth building panels against each other, preferably by snapping,
wherein said protrusion (2) and said protruding element (2') extend continuously along a corner portion (13) of the first building panel (1), such that the protrusion is gradually transformed into the protruding element along a horizontal continuous transition portion (C) disposed along the corner portion (13), and/or
wherein said male connector (15') and said lip (15) extend continuously along a corner section (13') of the second building panel (1'), such that the male connector is gradually transformed into the lip along a horizontal continuous transition portion (C') disposed along the corner section (13').

Item 2. The building panels according to item 1, wherein the corner portion (13) is provided horizontally outside of the tongue (5) and, in a perpendicular direction, horizontally outside of a locking groove (9') provided in said third edge portion (1c).

Item 3. The building panels according to item 1 or 2, wherein the protrusion (2) extends along a major portion, preferably essentially an entirety, of said first edge portion (1a) and wherein the protruding element (2') extends along a major portion, preferably essentially an entirety, of said third edge portion (1c).

Item 4. The building panels according to any of the preceding items, wherein the protrusion (2) and the protruding element (2') are provided at the same vertical level.

Item 5. The building panels according to any of the preceding items, wherein said third edge portion (1c) further comprises a female connector (16') configured to cooperate with a male connector (15') in said fourth edge portion (1d), the male connector (15') preferably extending along a major portion, optionally essentially an entirety, of said fourth edge portion (1d).

Item 6. The building panels according to any of the preceding items, wherein a horizontal extension (H1; H1') of said protrusion (2) and/or said protruding element (2') is essentially constant along the first (1a) and/or third (1c) edge portion(s) in the corner portion (13).

Item 7. The building panels according to any of the preceding items, wherein the lip (15), such as an upper section (15a) thereof, and the male connector (15'), such as an upper portion (15a') thereof, are provided at the same vertical level.

Item 8. The building panels according to any of the preceding items, wherein the tongue (5) is a separate tongue (5a) and wherein the first edge portion (1a) comprises an insertion groove (7) in which the separate tongue is arranged.

Item 9. The building panels according to any of the preceding items, wherein the tongue (5) is integrally formed with the first building panel (1).

Item 10. The building panels according to item 9, wherein the strip (6) comprises an undercut portion (14) configured to accommodate a portion of the strip (6) during a downward bending of the strip.

Item 11. The building panels according to any of the preceding items, wherein the locking device (10) further comprises a locking groove (9') provided in said third edge portion (1c) configured to cooperate with a locking element (8') for horizontal locking of the third (1c) and fourth (1d) edge portions, said locking element (8') being provided on a strip (6') extending beyond an upper portion (1h) of said fourth edge portion (1d).

Item 12. The building panels according to any of the preceding items, wherein the locking device (10) comprises an insertion member (7') provided in the third edge portion (1c) in which a, preferably separately formed, locking member (5a') is arranged and a depression (4') provided in a strip (6') of the fourth edge portion (1d) extending horizontally beyond an upper portion (1h) of the fourth edge portion, wherein the depression and the locking member are configured to cooperate for horizontal locking of the third and the fourth edge portions.

Item 13. Building panels, such as floor panels, comprising a locking device (10), the locking device comprising:
a protrusion (2) and a groove (3) configured to cooperate for vertical locking of a first edge portion (1a) of a first building panel (1) to an adjacent second edge portion (1b) of a second building panel (1'),
an insertion groove (7) provided in said first edge portion (1a) in which a separate tongue (5a) is arranged and a recess (4) provided in a strip (6) of the second edge portion (1b) extending horizontally beyond an upper portion (1f) of the second edge portion (1b), the recess (4) and the separate tongue (5a) being configured to cooperate for horizontal locking of the first (1a) and the second (1b) edge portions, and
the first (1a) and second (1b) edge portions being configured to be assembled to each other by a relative essentially horizontal displacement of the first (1) and second (1') building panels against each other, preferably by snapping, and/or by angling of the first (1) and second (1') building panels relative to each other,
the building panels comprising short and long edge portions and being configured to be arranged in a non-parallel pattern, such as a herringbone pattern, wherein the building panels further comprise a core (30) and a top layer (31) comprising wood fibres (32), a fibre orientation of at least a portion of the wood fibres (32) of the top layer of the first building panel (1) being provided mainly perpendicularly to a fibre orientation of at least a portion of the wood fibres (32) of the top layer of the second building panel (1') in an assembled state of the building panels.

Item 14. The building panels according to item 13, wherein the first (1a) and second (1b) edge portions are short and long edge portions, respectively.

Item 15. The building panels according to item 13 or 14, wherein the fibre orientation of the wood fibres (32) of each of the first (1) and second (1') building panels is essentially parallel with their respective long edge portions.

Item 16. The building panels according to any of the preceding items 13-15, wherein a longitudinal extension of the short edge portions is larger than 7 cm, preferably larger than 8 cm, more preferably larger than 10 cm.

Item 17. The building panels according to any of the preceding items 13-16, wherein a longitudinal extension of the long edge portions is smaller than 1.5 m, preferably smaller than 1.0 m.

Item 18. The building panels according to any of the preceding items 13-17, wherein the core (30) comprises wood fibres (33), preferably comprising an HDF board or an MDF board.

Item 19. The building panels according to any of the preceding items 13-18, wherein a thickness of the top layer (31) is less than 3 mm, such as less than 1 mm.

Item 20. The building panels according to any of the preceding items 13-19, wherein the top layer (31) comprises a wood lamella layer or a veneer layer.

Item 21. The building panels according to any of the preceding items 13-20, wherein the building panels further comprise a balancing layer (34).

Item 22. The building panels according to any of the preceding items 13-21, further comprising a locking device (10) according to any of the items 1-12 or claims 1-17.

The invention claimed is:

1. Building panels comprising a locking device, the locking device comprising:
a protrusion and a groove configured to cooperate for vertical locking of a first edge portion of a first building panel to an adjacent second edge portion of a second building panel;
an insertion groove provided in said first edge portion in which a separate tongue is arranged; and
a recess provided in a strip of the second edge portion extending horizontally beyond an upper portion of the second edge portion,
the recess and the separate tongue being configured to cooperate for horizontal locking of the first and the second edge portions,
the first and second edge portions being configured to be assembled to each other by a relative essentially horizontal displacement of the first and second building panels against each other, and/or by angling of the first and second building panels relative to each other,
said insertion groove being provided vertically below at least one horizontal plane extending along a vertical locking surface provided in a third edge portion of the first building panel, said vertical locking surface being configured to vertically lock the third edge portion to an adjacent fourth edge portion of a third building panel, wherein an entirety of the protrusion is below and spaced from the at least one horizontal plane by a distance, and
said third edge portion being configured to be assembled to said fourth edge portion by angling of the first and third building panels relative to each other and/or by a relative essentially horizontal displacement of the first and third building panels against each other.

2. The building panels according to claim 1, further comprising a protruding element provided in said third edge portion for vertical locking of said third and fourth edge portions, wherein an upper side of the protruding element comprises the vertical locking surface.

3. The building panels according claim 1, further comprising a protruding element provided in said third edge portion for vertical locking of said third and fourth edge portions, said protrusion and said protruding element extending continuously along a corner portion of the first building panel, such that the protrusion is gradually transformed into the protruding element along a horizontal continuous transition portion disposed along the corner portion.

4. The building panels according to claim 1, further comprising a female and a male connector provided in said third and fourth edge portions, respectively, for vertical locking of said third and fourth edge portions, wherein an upper wall of the female connector comprises the vertical locking surface.

5. The building panels according to claim 1, wherein a top side of the protrusion and/or a top wall of a lip groove arranged between the protrusion and an upper shoulder portion is provided along said at least one horizontal plane.

6. The building panels according to claim 1, wherein a vertically innermost portion of said insertion groove is spaced from said at least one horizontal plane by a second distance.

7. The building panels according to claim 1, wherein the insertion groove is provided horizontally inside of a vertical plane defined in an assembled state of the building panels by upper portions of said first and second edge portions, the vertical plane being perpendicular to a horizontal plane, which is parallel to a front side and/or a rear side of the building panels.

8. The building panels according claim 7, wherein the recess is provided horizontally outside of the vertical plane in said assembled state.

9. The building panels according to claim 1, wherein the protrusion and the groove are provided in said first edge portion and said second edge portion, respectively.

10. The building panels according to claim 1, wherein the first and second edge portions are short edge portions and wherein the third and fourth edge portions are long edge portions.

11. The building panels according to claim 1, further comprising a locking groove provided in said third edge portion configured to cooperate with a locking element for horizontal locking of the third and fourth edge portions, said locking element being provided on a strip extending beyond an upper portion of said fourth edge portion.

12. The building panels according to claim 1, wherein the separate tongue comprises a locking portion configured to provide said horizontal locking.

13. The building panels according to claim 12, wherein an inner portion of the separate tongue is fixedly arranged in the insertion groove and wherein an outer portion of the separate tongue comprises said locking portion.

14. The building panels according to claim 12, wherein at least a portion of the separate tongue is displaceably arranged in the insertion groove.

15. The building panels according to claim 1, wherein the separate tongue is extruded.

16. The building panels according to claim 1, wherein the building panels are floor panels, wall panels or furniture components.

17. Building panels comprising a locking device, the locking device comprising:
   a protrusion and a groove configured to cooperate for vertical locking of a first edge portion of a first building panel to an adjacent second edge portion of a second building panel;
   an insertion groove provided in said first edge portion in which a separate tongue is arranged; and
   a recess provided in a strip of the second edge portion extending horizontally beyond an upper portion of the second edge portion,
   the recess and the separate tongue being configured to cooperate for horizontal locking of the first and the second edge portions,
   the first and second edge portions being configured to be assembled to each other by a relative essentially horizontal displacement of the first and second building panels against each other, and/or by angling of the first and second building panels relative to each other,
   said insertion groove being provided vertically below at least one horizontal plane extending along a vertical locking surface provided in a third edge portion of the first building panel, said vertical locking surface being configured to vertically lock the third edge portion to an adjacent fourth edge portion of a third building panel,
   said third edge portion being configured to be assembled to said fourth edge portion by angling of the first and third building panels relative to each other and/or by a relative essentially horizontal displacement of the first and third building panels against each other,
   the first and third edge portions comprising a lip groove and a female connector, respectively,
   the second and fourth edge portions comprising a lip and a male connector, respectively,
   the lip of the second edge portion being configured to cooperate with the lip groove of the first edge portion in an assembled state of the building panels,
   the male connector of the fourth edge portion being configured to cooperate with the female connector of the third edge portion in the assembled state of the building panels, and
   wherein a top surface of the lip of the second edge portion and a top surface of the male connector of the fourth edge portion are coplanar.

* * * * *